(12) United States Patent
Dingliwal et al.

(10) Patent No.: US 12,718,030 B2
(45) Date of Patent: Aug. 25, 2026

(54) LARGE LANGUAGE MODELS PROVIDING EVIDENCE MAPPINGS FOR GENERATED OUTPUT

(71) Applicant: Amazon Technologies, Inc., Seattle, WA (US)

(72) Inventors: Saket Dingliwal, Kirkland, WA (US); Karthik Gopalakrishnan, Sunnyvale, CA (US); Sravan Babu Bodapati, Fremont, CA (US); Sarthak Handa, Seattle, WA (US); Katrin Kirchhoff, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 266 days.

(21) Appl. No.: 18/344,742

(22) Filed: Jun. 29, 2023

(65) Prior Publication Data

US 2025/0005298 A1 Jan. 2, 2025

(51) Int. Cl.
*G06F 40/40* (2020.01)
*G06F 40/20* (2020.01)

(52) U.S. Cl.
CPC .............. *G06F 40/40* (2020.01); *G06F 40/20* (2020.01)

(58) Field of Classification Search
CPC ................................. G06F 40/40; G06F 40/20
See application file for complete search history.

(56) References Cited

U.S. PATENT DOCUMENTS

| | | | | |
|---|---|---|---|---|
| 10,409,898 | B2 | 9/2019 | Sharma et al. | |
| 10,474,709 | B2 | 11/2019 | Paulus | |
| 10,614,106 | B2 | 4/2020 | Kelsey et al. | |
| 10,685,050 | B2 | 6/2020 | Krishna et al. | |
| 10,909,157 | B2 | 2/2021 | Paulus et al. | |
| 10,929,392 | B1 | 2/2021 | Cheng | |
| 11,017,156 | B2 | 5/2021 | Hwang | |
| 11,455,543 | B2 | 9/2022 | D'Souza et al. | |
| 11,557,276 | B2 | 1/2023 | Bender et al. | |
| 12,063,123 | B1 * | 8/2024 | Rivera-Rodriguez | H04L 12/1831 |
| 2018/0046937 | A1 * | 2/2018 | Allen | G06N 5/04 |
| 2019/0122766 | A1 * | 4/2019 | Strader | G06F 40/279 |
| 2019/0163875 | A1 * | 5/2019 | Allen | G16H 50/70 |
| 2021/0043211 | A1 * | 2/2021 | Leidner | G10L 15/26 |
| 2021/0134173 | A1 | 5/2021 | Yuan et al. | |

(Continued)

OTHER PUBLICATIONS

U.S. Appl. No. 18/344,739, filed Jun. 29, 2023, Devang Kulshresthra, et al.

(Continued)

*Primary Examiner* — Darioush Agahi
(74) *Attorney, Agent, or Firm* — Robert C. Kowert; Kowert, Hood, Munyon, Rankin & Goetzel, P.C.

(57) ABSTRACT

A data set comprising a plurality of records is obtained. A given record of the data set includes a source set of text tokens to be analyzed, and a corresponding annotated analysis result. An annotation corresponding to a text sequence of the result indicates a portion of the source set which comprises evidence for the text sequence. A machine learning model is trained using the data set to generate annotated analysis results of source text sets. A first annotated analysis result corresponding to a first source set of tokens is generated using a trained version of the model, and provided via a programmatic interface.

20 Claims, 17 Drawing Sheets

(56) References Cited

U.S. PATENT DOCUMENTS

| | | | | |
|---|---|---|---|---|
| 2021/0209304 | A1 * | 7/2021 | Yang | G06F 40/295 |
| 2022/0067284 | A1 * | 3/2022 | He | G06F 16/345 |
| 2022/0068276 | A1 * | 3/2022 | Munetomo | G06F 16/148 |
| 2022/0091706 | A1 * | 3/2022 | Winn | G06F 16/54 |
| 2023/0034401 | A1 * | 2/2023 | Weston | G06F 40/30 |
| 2023/0274095 | A1 * | 8/2023 | Kelkar | G06F 40/247 704/9 |
| 2023/0403174 | A1 * | 12/2023 | Mohanty | H04L 12/1831 |
| 2024/0095458 | A1 * | 3/2024 | Sawarkar | G06F 40/35 |
| 2024/0119220 | A1 * | 4/2024 | Aggarwal | G06N 3/08 |
| 2024/0211681 | A1 * | 6/2024 | Jiao | G06F 40/279 |
| 2024/0273306 | A1 * | 8/2024 | Somaiya | G06F 40/186 |
| 2024/0296748 | A1 * | 9/2024 | Gogin | G09B 19/06 |
| 2024/0340193 | A1 * | 10/2024 | Zhu | G06F 40/30 |
| 2024/0362417 | A1 * | 10/2024 | Imani | G06N 3/09 |
| 2024/0370703 | A1 * | 11/2024 | Sikka | G06F 40/30 |
| 2025/0005303 | A1 * | 1/2025 | Gray | G06F 16/3328 |

OTHER PUBLICATIONS

Google DeepMind, "Teaching language models to support answers with verifiedquotes", Mar. 16, 2022, pp. 1-40.

Pei Zhouo, et al., "Think Before You Speak: Explicitly Generating Implicit Commonsense Knowledge for ResponseGeneration," https://arxiv.org/abs/2110.08501, Jun. 7, 2022, pp. 1-17.

"Yi Tay, et al.., ""Transformer Memory as a Differentiable Search Index,"" https://arxiv.org/abs/2202.06991, Oct. 21, 2022, pp. 1-14."

Yujing Wang, et al.,"A Neural Corpus Indexer for Document Retrieval," https://arxiv.org/abs/2206.02743, Feb. 12, 2023, pp. 1-19.

"Bernd Bohnet, et al., ""Attributed Question Answering:Evaluation and Modeling for Attributed Large Language Models"" https://arxiv.org/abs/2212.08037, Feb. 10, 2023, pp. 1-15."

Aleksandra Piktus, et al., "Retrieval-Augmented Generation for Knowledge-Intensive NLP Tasks," https://arxiv.org/abs/2005.11401, Apr. 12, 2021, pp. 1-19.

* cited by examiner

*Objective 210: Automatically generate summaries with annotations that indicate evidence mappings, thereby reducing effort required by conversation participants or assistants, and reduced probability of errors or "hallucinations" in summaries*

Figure 11:
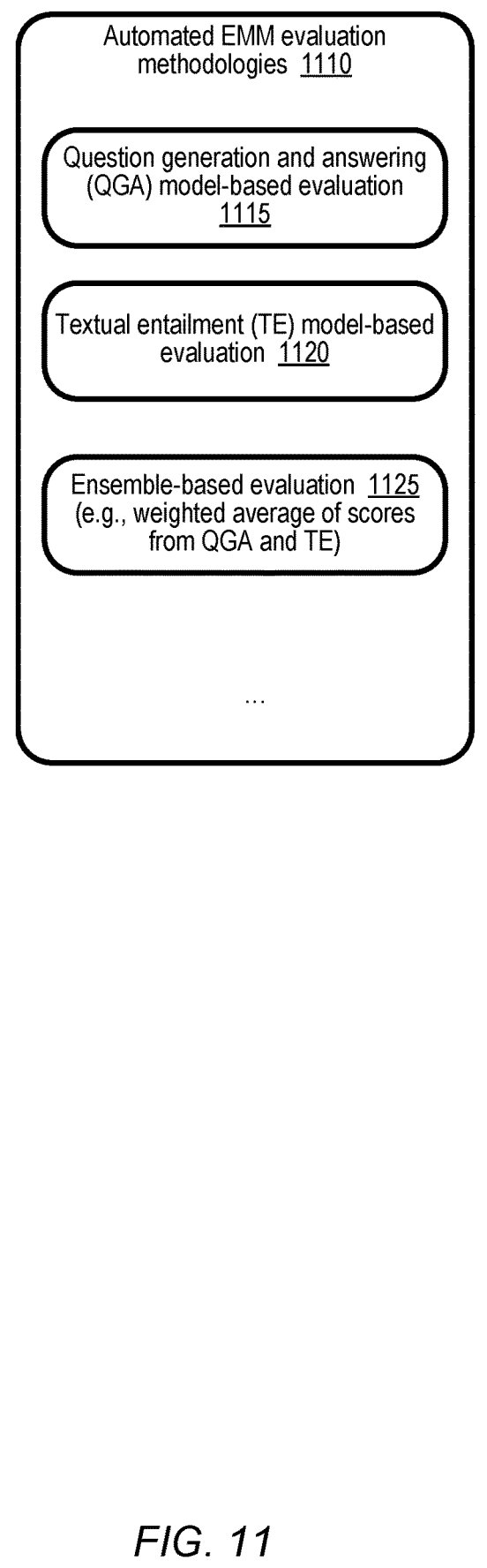

Automated EMM evaluation methodologies 1110

Question generation and answering (QGA) model-based evaluation 1115

Textual entailment (TE) model-based evaluation 1120

Ensemble-based evaluation 1125 (e.g., weighted average of scores from QGA and TE)

Identify, e.g., based on input received via programmatic interfaces at an analytics service of a cloud computing environment, a plurality of evidence mapping models (e.g., LLMs trained using respective data sets to provide evidence for various subsets of their summaries of a corresponding source text collection (STC)) EMM1, EMM2, ... whose quality is to be evaluated 1602

Corresponding to each EMM, obtain a set of pairs of text collections to be used for evaluating the EMM, e.g., with one collection in a given pair comprising an STC, and the second collection comprising summaries annotated with evidence mappings (EMs) generated by the EMM 1606

Select evaluation methodology for comparing the EMMs, e.g., based on problem domain or additional programmatic inputs 1608

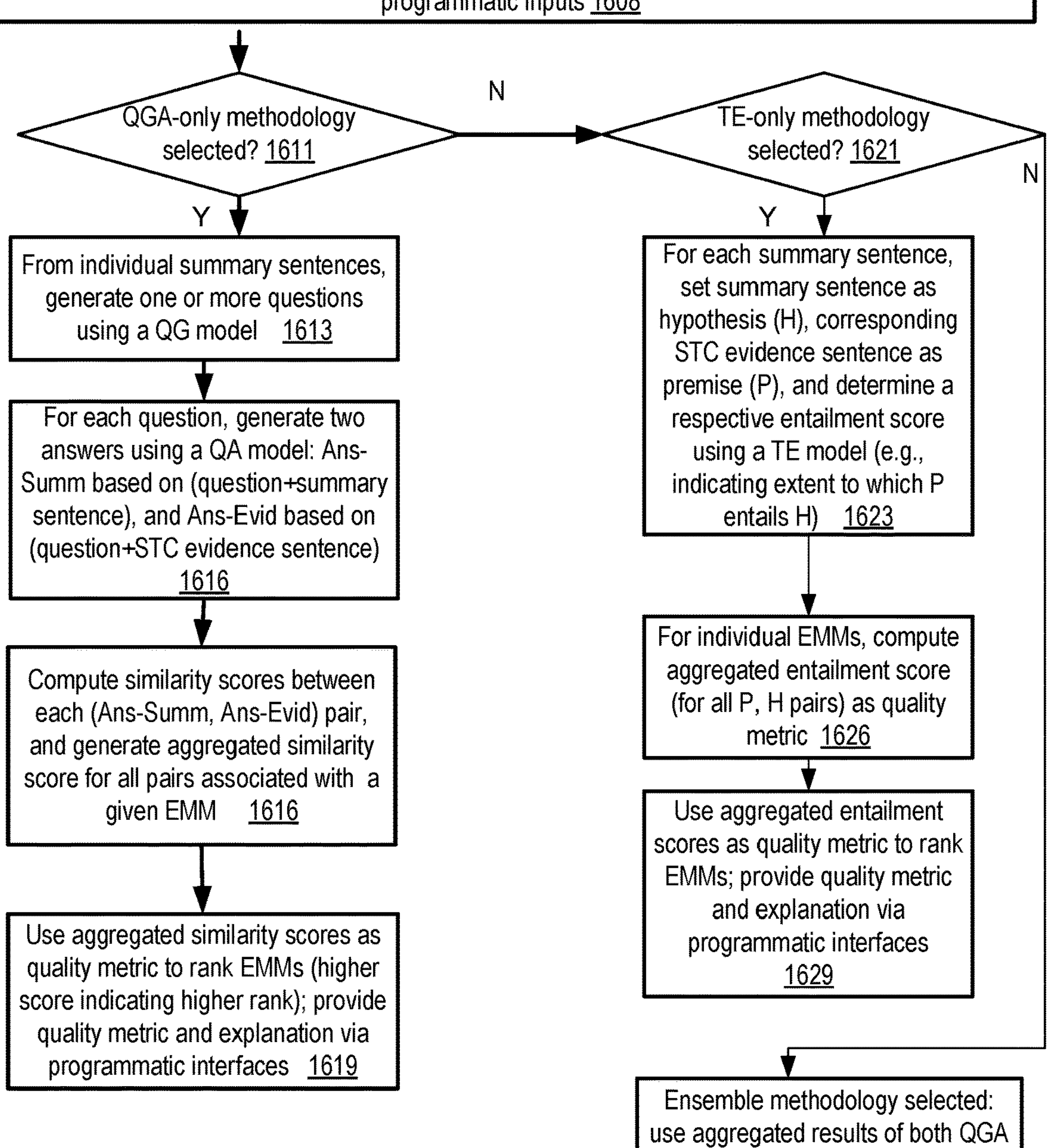

FIG. 16

LARGE LANGUAGE MODELS PROVIDING EVIDENCE MAPPINGS FOR GENERATED OUTPUT

BACKGROUND

Large language models (LLMs) are becoming increasingly capable of performing tasks such as answering questions expressed in natural language, summarizing text and the like. In some cases, however, LLMs may introduce incorrect or nonsensical statements referred to as "hallucinations" in their output. The presence of hallucinations in LLM-generated text can in general lead to lowering end users' trust in LLM capabilities, and in some use cases (e.g., in scenarios in which LLMs are used for health-related applications) may potentially lead to non-trivial negative real-world impacts.

BRIEF DESCRIPTION OF DRAWINGS

FIG. 11 illustrates example automated techniques for evaluating evidence mapping models, according to at least some embodiments.

FIG. 16 is a flow diagram illustrating aspects of operations which may be performed to automate evaluation of evidence mapping models, according to at least some embodiments.

Figure 1:
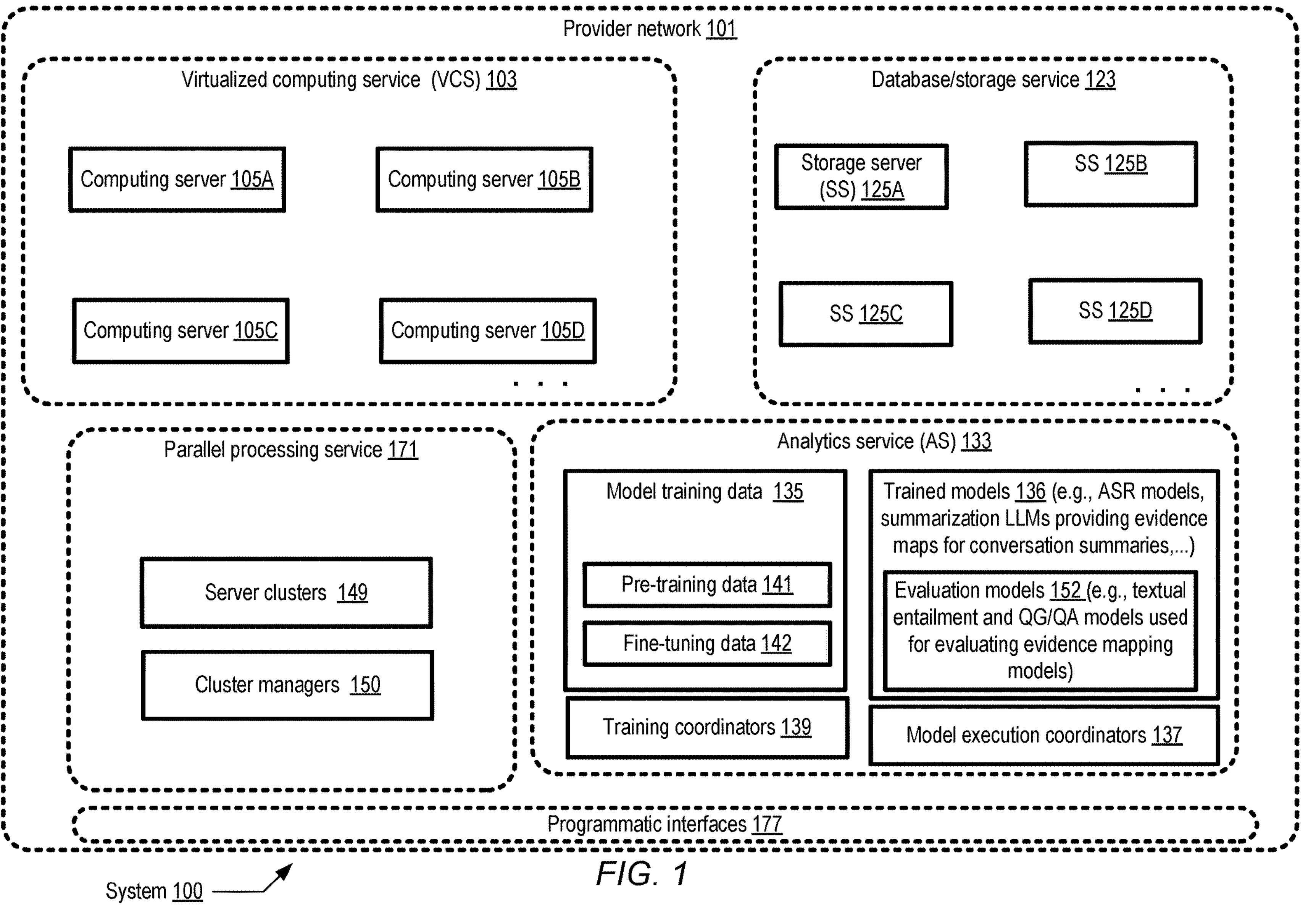
FIG. 1 illustrates an example system environment in which a cloud-based analytics service may host a variety of machine learning models including large language models (LLMs) which provide evidence for the content of summarized conversations, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for reducing the probability of hallucinations in the output produced by large language models (LLMs), such as LLMs that are utilized to generate summaries of doctor-patient conversations, by requiring the LLMs to provide evidence for various subsets of their output, and by evaluating the evidence-providing LLMs in an automated data-driven manner to select the LLMs that are least likely to generate hallucinations. In some embodiments, one or more LLMs that have been fine-tuned for various kinds of inference tasks on input that comprises text, such as summarizing conversations whose text transcripts are available, answering natural language questions, and so on may be prepared and hosted at a network-accessible service of a cloud provider network or cloud computing environment. In one embodiment, a network-accessible service which is dedicated to managing health information such as doctor-patient conversation summaries in accordance with standards developed by the healthcare industry may utilize an LLM designed to generate evidence-providing annotations for such summaries. Such an LLM may be referred to as an annotated summarization LLM or an evidence mapping LLM.

Given a transcript of a conversation between a doctor and a patient as input, comprising a collection of transcript sentences, in various embodiments an annotated summarization LLM that has been fine-tuned at the cloud-based service may generate at least two kinds of output: (a) a summary of the transcript/conversation, comprising one or more summary sentences, and (b) annotations which indicate, as evidence for at least some of the summary sentences, corresponding portions of the transcript. The transcript may represent one example of a source set of text tokens that can be analyzed using an LLM, and the combination of the summary and annotations generated by the LLM may represent one example of an annotated result set corresponding to the source set of text tokens. In some implementations, the annotations may be formatted in a manner similar to the citations typically included in scientific publications, with reference such as "[1]", "[2]" and the like in numeric citation format, referring back to numbered sentences or conversation turns in the transcripts. Because the LLM has been fine-tuned to provide such evidence, the probability of hallucinations in its output may be reduced substantially compared to scenarios in which such concrete evidence annotation is not required from the LLM being used to generate the summaries. In at least some embodiments, if the summary generated by the fine-tuned LLM happens to contain a sentence for which no evidence annotation is provided, such a sentence may be deleted before the summary is presented to a client on whose behalf the summary was generated, thereby further reducing the likelihood of hallucinations in the presented version of the summary.

Several different evidence mapping LLMs may be fine-tuned in some embodiments, e.g., using respective data sets or respective model architectures and algorithms. These alternative LLMs, each of which may be considered a candidate for production use, may be evaluated relative to one another automatically using other machine learning models such as question-generated models, question-answering models, and textual entailment models in various embodiments, without requiring tedious and error-prone evaluation by human teams. These other models, referred to as evaluation models, may themselves comprise LLMs in some implementations. The evaluation models may be provided examples of the transcripts and corresponding annotated summaries generated by the different candidate evidence mapping models, and generate respective quality scores for each candidate evidence mapping model based on analysis of the examples. Each evaluation technique may use a different approach towards generating the scores. For example, in a question-generation-and-answering (QGA) evaluation technology, in one embodiment respective natural language questions may be generated from various sentences of the summaries, and the similarities of the answers that are then generated to those questions by a question answering model using (a) the summary sentences and (b) the corresponding evidence sentences in the transcripts may be computed. The quality of the different evidence mapping models may then be estimated based on the similarity scores of the generated answers—the more similar the two kinds of answers are found to be, the better the quality of the evidence mapping LLM may be assumed to be. In a textual entailment model based evaluation methodology, in one embodiment the fraction of summary sentences that are identified as being entailed from corresponding transcript sentences may be computed, and the quality of the candidate evidence mapping models may be assumed to be proportional to this fraction. In other embodiments, instead of computing the fraction of sentences that are entailed, more general entailment scores may be generated for each summary sentence and a corresponding source transcript sentence may be computed, and such entailment scores may be used to judge the quality of the evidence mapping LLM. In some embodiments, multiple automated evaluation techniques may be used, while in other embodiments one of the automated evaluation techniques may be selected, e.g., based on the problem domain for which the evidence mapping models are to be deployed, and/or based on programmatic input received from a client at the network-accessible service at which the evaluation is to be performed. The best-performing evidence mapping LLMs, identified using the scores produced via one or more automated evaluation techniques, may then be selected for use in production in various embodiments.

Evidence attribution techniques of the kind introduced above may be implemented for several different kinds of tasks performed with respect to source text token collections using LLMs in some embodiments, and are not limited to summarization tasks for conversations between medical professionals and patients. For example, the techniques may be implemented for summarization of other types of conversations, such as conversations between legal professionals and their clients, or even conversations between people and other LLMs. Evidence mappings may also be generated by LLMs that perform tasks such as question answering, classification and the like in some embodiments.

As one skilled in the art will appreciate in light of this disclosure, certain embodiments may be capable of achieving various advantages, including some or all of the following: (a) reducing the occurrences of hallucinations and other similar errors in the output generated by LLMs for healthcare related applications, which may in turn eventually lead to improved health outcomes for patients (e.g., as a result of reduction in workloads of the health care professionals responsible for generating or checking summaries of doctor-patient conversations) and/or (b) speeding up evaluation of candidate evidence mapping LLMs prior to production deployment, using data-driven automated evaluation techniques, thereby further reducing the likelihood of errors in outputs of the LLMs selected for deployment to production environments.

According to some embodiments, a system may include one or more computing devices. The computing devices may include instructions that upon execution at the computing devices cause the computing devices to identify, e.g., at a network-accessible service of a cloud provider network, a pre-trained version of an LLM which is to be used to generate summaries of dialogs between two or more parties. A data set comprising a plurality of records to be used for fine-tuning the pre-trained LLM may be obtained. An individual record of the plurality of records may comprise (a) an instruction prompt requesting a creation of an annotated summary of a transcript of a dialog between a given set of dialog participants (such as a doctor and a patient), (b) the transcript of the dialog, and (c) an annotated summary of the transcript. The terms "dialog" and "conversation" may be used synonymously herein to refer to natural language exchanges between two or more communicating entities, with the different entities/participants involved taking respective turns to communicate with one another. A given annotated summary of the data set may comprise a plurality of text sequences such as sentences or turns (where each turn may comprise a portion of one or more sentences), and a respective annotation corresponding to individual text sequences of the plurality of text sequences. An annotation corresponding to a particular text sequence may for example indicate (e.g., via a numeric identifier in a format such as "[1]", "[2]" etc.) a portion of the transcript which comprises evidence for the particular text sequence. Such annotations may also be referred to as evidence mappings herein, as each such annotation may indicate a specific relationship or mapping between a text sequence in the summary and the corresponding evidence in the source transcript.

The pre-trained LLM may be fine-tuned at the service, e.g., using at least the data set as input. During the fine-tuning, the LLM may learn to generate annotated summaries of transcripts of dialogs, with the annotations in the generated annotated summaries indicating portions of the corresponding transcripts which comprise evidence for one or more text sequences included in the annotated summaries in various embodiments. A fine-tuned version of the LLM may be stored, e.g., in a repository of models of the service in some embodiments. The stored version of the LLM may be employed to provide respective annotated summaries of transcripts of various dialogs in some embodiments. The participants in the dialogs/conversations whose records have been included in the data set used for fine-tuning the LLM, and whose dialogs/conversations are eventually summarized using the fine-tuned version of the LLM, may have opted in for creation of automated summaries of their conversations in various embodiments, e.g., by granting permission via programmatic interfaces and/or in written form.

In some embodiments, the instruction prompts included in the different records of the fine-tuning data set may be identical. In other embodiments, the instruction prompts may vary at least slightly from one record to another; this may be done so as to make the LLM more capable of responding to prompts that provide similar guidance but need not be identical. In one embodiment, one or more keywords (such as names of medicines or names of treatment options in the case of medical dialogs) may be extracted automatically from a dialog transcript, and the instruction prompt may specify that the generated summary should include at least some of the keywords.

A number of different annotation techniques or options may be utilized in different embodiments. For example, in one embodiment the sentences or text sequences of a transcript may be labeled using numeric sequence numbers (such as "1" for the first sentence spoken, or turn taken, in the corresponding dialog, "2" for the next sentence/turn, etc.), and the annotations of the generated summary may include references in numeric citation formats (e.g., "[1]" to indicate the first sentence/turn of the transcript as evidence for a given annotated text sequence, "[2]" to indicate the second sentence/turn of the transcript as evidence for another annotated text sequence and so on. As such, a given transcript may comprise a set of valid annotation options ("[1]", "[2]" through "[n]" if the dialog contained n sentences/turns), with other values for annotations being invalid (such as "[−5]", "[n+2]", "[doctor]", etc.). In at least some embodiments, a technique referred to as constrained decoding may be employed to restrict the annotations generated by the LLM during inference (e.g., after the fine-tuned LLM has been deployed for production use) to only the valid options. In such embodiments, prior to generation of an annotated summary of a particular transcript, a set of valid annotation options for indicating evidence in that annotated summary may be determined at the network-accessible service at which the LLM is deployed for inference. During inference with respect to that particular transcript, the LLM may be programmatically constrained to include, within the annotated summary, no other annotation options than members of the set of valid annotation options. Such programmatic constraining of the output generated by the LLM during inference may comprise setting probabilities associated with one or more vocabulary tokens (tokens that do not belong to the set of valid annotation options) of the LLM to zero in some implementations. The constraints may be relaxed after the output representing the evidence annotation is complete in various embodiments, enabling the LLM to resume using all of its vocabulary in an unconstrained manner.

In some embodiments, the transcript of a dialog which is then summarized using the LLM may itself be generated at a cloud provider network. For example, audio signals representing the dialog may be transmitted from a remote location (e.g., a doctor's office) to the provider network, and converted into a transcript using an automatic speech recognition (ASR) service implemented at the provider network.

In at least some embodiments, the annotated summary may be displayed, e.g., to staff at a doctor's office or hospital, using visual cues to indicate the evidence for each portion of the summary. For example, the summary may be shown in one portion of a displayed web page, with the corresponding transcript being shown in another portion of the displayed web page, and with similar font colors (or arrows) being used to indicate the evidentiary relationships between sentences of the summary and turns/sentences of the transcript.

According to some embodiments, another system, which may be used for automated evaluation of evidence mapping models, may include one or more computing devices. The computing devices may include instructions that upon execution at the computing devices cause the computing devices to obtain, at a network-accessible service of a cloud provider network, a plurality of pairs of text collections. An individual pair of text collections may comprise (a) a source text collection which includes a first plurality of sentences and (b) an annotated summary of the source text collection, comprising a second plurality of sentences and a set of evidence mappings. Corresponding to a first sentence of the second plurality of sentences, the set of evidence mappings may include a first evidence mapping, which indicates that a second sentence within the source text collection provides evidence for the first sentence. The set of evidence mappings may have been generated by an evidence mapping model (EMM) such as an annotated summarization LLM of the kind discussed earlier. Note that in some embodiments the task of generating evidence for a summary may be performed by a different model (or model(s)) than the one that was used for generating the summary itself. As such, while an annotated summarization LLM may represent one example of an EMM (which generates both the summary and the evidence annotations for various portions of the summary), other EMMs may obtain a pre-generated summary (which does not include annotations indicating evidence) and the corresponding source text, and then generate annotations/mappings indicating the evidence.

Tools (such as other machine learning models) for implementing one or more automated methodologies for evaluation of EMMs may be available at the service. At least a first automated evaluation methodology for obtaining, using the plurality of text pair collections, a quality metric of the EMM may be selected in various embodiments. In accordance with the selected automated evaluation methodology, in some embodiments, the following tasks may be performed. Using a question generation (QG) machine learning model, a first question corresponding to a particular summary sentence of a particular annotated summary included in a particular pair of text collections may be automatically generated. The particular pair of text collections may comprise a particular source text collection. A question answering (QA) machine learning model may then be used to generate two answers to the first question. The first answer Answer1, comprising some number of text tokens, may be obtained by providing, as input to the QA model, input which includes the particular summary sentence and the first question. The second answer Answer2, comprising another set of text tokens, may be obtained by providing, as input to the QA model, input which includes a source sentence of the particular source text collection (the source sentence which was indicated as evidence for the particular summary sentence in an evidence mapping of the annotated summary) and the first question. A similarity metric may be computed between the two answers (Answer1 and Answer2). A quality metric may be computed for the EMM using at least the similarity metric obtained from the QG and QA models in various embodiments. In at least some embodiments, the quality metric may be provided via one or more programmatic interfaces of the network-accessible service, e.g., to a client or administrator responsible for choosing one EMM from a set of alternative candidate EMMs that should be deployed for production use. In one embodiment, in addition to the quality metric itself, an explanation of the quality metric (e.g., including lower-level details such as Answer1 and Answer2 to the same question, and/or the similarity metric computed between Answer1 and Answer2) may be provided via the programmatic interfaces. The automated evaluation methodology which employs a QG model and a QA model as indicated above may be referred to as a QGA methodology herein.

In some embodiments, one of the automated evaluation methodologies available at the service may utilize a textual entailment (TE) model. According to this methodology, pairs of sentences may be provided to the TE model as input, with a first sentence (taken from a source text collection) of a given pair being designated as a premise, and the second sentence (taken from a summary generated by the EMM of the source text collection, such that the EMM has indicated that the first sentence is evidence for the second sentence) being designated as a hypothesis. For a given pair of sentences provided to it as input, the TE model may generate one of three possible outcomes: (a) an indication that the hypothesis sentence is entailed by, or logically follows from, the premise sentence, (b) an indication that the hypothesis sentence is contradicted by, or does not logically follow from, the premise sentence or (c) that the TE model is unable to conclude whether the hypothesis sentence is entailed by the premise sentence or not, and therefore considers the hypothesis unrelated to the premise. In some embodiments a probability value or score of entailment of the hypothesis from the premise may be provided by the TE model, instead of providing one of the above three outcomes; the higher the score or probability value, the more likely the TE model considers the hypothesis to be entailed by the premise. The scores or entailment metrics produced by the TE model for various sentence pairs may be used to compute an overall quality score for the EMM in some embodiments.

In at least some embodiments, an aggregation of quality scores (such as a weighted mean quality score) from different evaluation methodologies such as the TE-based methodology and the QGA methodology may be used to generate an overall quality score for each EMM which is evaluated. In some embodiments, the weights may be assigned based at least in part on small-scale studies conducted with the help of human evaluators of the EMMs (e.g., studies in which a relatively small number of pairs of text collections are used to evaluate a set of EMMs). In one simple example, if human evaluators tend to agree more closely with the quality metrics produced for EMMs by the QGA approach 60% of the time in such a study, and agree more closely with quality metrics produced for EMMs by the TE approach 40% of the time, a weight of 0.6 may be assigned to the QGA-based quality score and a weight of 0.4 may be assigned to the TE-based quality score when aggregating the two. In one embodiment, automated evaluation methodologies other than the QGA and TE methodologies may be employed for evaluating at least some EMMs. In some embodiments, the particular automated evaluation methodology to use may be selected based on the problem domain or use case of the EMM—e.g., for doctor-patient conversation EMMs, a QGA approach may be chosen based on the determination that a larger amount of training data of that domain was used for training the QG and QA models than was available for training the TE model, while for summarizing newspaper articles a TE approach may be chosen based on a determination that a larger amount of training data of newspaper domain was used for training the TE model than was available for training the QG/QA models. In some embodiments, at least some of the models used in automated evaluation of EMMs may themselves comprise one or more LLMs.

In some embodiments, the techniques introduced above for preparing an annotated summarization LLM that provides evidence mappings and/or for evaluating candidate EMMs may be implemented at a network-accessible analytics service of a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

FIG. 1 illustrates an example system environment in which a cloud-based analytics service may host a variety of machine learning models including large language models (LLMs) which provide evidence for the content of summarized conversations, according to at least some embodiments. As shown, system 100 comprises resources and artifacts of several network-accessible services of a provider network 101. The services include a virtualized computing service (VCS) 103, a database/storage service 123, a parallel processing service 171, as well as analytics service (AS) 133 in the depicted embodiment.

At the AS 133, model training data 135 may include at least two kinds of data which may be used to training machine learning models such as LLMs. Pre-training data 141 may, for example, comprise large corpuses of unlabeled data obtained from sources such as portions of the world-wide-web, code repositories and the like, which may be used during unsupervised or self-supervised phases of training of various machine learning models. Fine-tuning data 142 may include smaller collections of records, including records which include instructions as well as examples of the results of following the instructions. For example, to fine-tune a pre-trained LLM (which has learned to reason about natural language inputs in general) to generate annotated summaries of conversation transcripts, in some embodiments a collection of records of a fine-tuning data set obtained at the AS may each comprise the following elements in the depicted embodiment: (a) an instruction prompt, (b) the transcript of a conversation between two or more parties, comprising a plurality of sentences or text token sequences and (c) an annotated summary of the transcript. The instruction prompt of a given record may comprise a few natural language sentences requesting creation of the annotated summary from the transcript. The annotated summary may comprise one or more text sequences with associated annotations. In one embodiment at least some of the records of the data set may not include instruction prompts. A given annotation associated with a given text sequence of the summary may indicate a portion of the transcript which comprises evidence for that text sequence of the sequence. Other types of data sets may also be obtained for fine-tuning LLMs in some embodiments and stored at the AS as part of model training data 135.

A collection of trained models 136 may be prepared and stored at the AS in the depicted embodiment, to be executed for a variety of applications on behalf of clients of the AS. The preparation of the models may include one or more training phases, including (in the case of LLMs) a pre-training phase and a fine-tuning phase, some or all of which may be orchestrated by training coordinators 139 implemented using software and hardware of one or more computing devices in various embodiments. For example, one or more LLMs may be pre-trained using the pre-training data 141, and one or more of the pre-trained LLMs may then be selected for instruction fine-tuning (using the pre-training records which contain instruction prompts of the kind mentioned above) during which the pre-trained LLMs are further trained to produce annotated summaries of conversations.

The fine-tuned version of an LLM, now capable of generating annotated summaries of conversations (where the annotations comprise evidence mappings which indicate specific evidence within the transcript for various portions of the summary), may be executed in response to obtained transcripts of conversations in the depicted embodiment. In at least some embodiments, the trained models 136 may include automatic speech recognition (ASR) models to which audio of conversations to be summarized may be transmitted from outside the provider network, and the ASR models may generate the transcripts from the audio input. The generated transcripts may then be passed on to the fine-tuned annotated summarization LLM, which may generate corresponding summaries and evidence mappings as annotations. A fine-tuned annotated summarization LLM may represent one example of an evidence mapping model (EMM) in the depicted embodiment; other examples of EMMS may include LLMs that can for example answer natural language questions about input text records while providing evidence (from within the input text) for their answers, LLMs that can participate in chats and provide evidence (from earlier portions of the chats) for each of their chat outputs, and so on.

In some embodiments, several different fine-tuned LLMs may be prepared as candidates for conversation/dialog summarization or other language analysis tasks, e.g., using respective sets of fine-tuning data sets as input, or starting from respective versions of pre-trained LLMs. In the depicted embodiment, the trained models 136 may comprise a set of evaluation models 152 which can be used to automate the evaluation of the quality of the candidate LLMs or EMMs. The automated evaluation models 152 may in some embodiments include one or more trained question generation (QG) models, one or more question answering (QA) models, and one or more textual entailment (TE) models. To evaluate a given EMM, pairs of text collections which include summaries of source text material, as well as the source text itself, may be provided as input to an evaluation model in the depicted embodiment. For example, in a scenario in which a QG/QA model-based technique is employed for evaluation, a respective question may first be generated corresponding to one or more sentences of a summary generated by the candidate EMM from a particular source text. Then, the QA model may be fed two input records to obtain respective answers A1 and A2. To obtain answer A1, an input record which includes the generated question and the summary sentence (or text sequence other than a sentence) from which the question was generated may be provided to the QA model. To obtain answer A2, an input record which includes the generated question and the source sentence (or text sequence) which was presented as the evidence for the summary sentence may be provided to the QA model. Intuitively, if A1 is very similar to A2, and the similarity level is high for all the text sequence pairs provided for evaluation purposes, this would suggest that the EMM did a good job at generating the evidence for the summary. In contrast, if A1 is not very similar to A2 for a significant fraction of the text sequence pairs, this would suggest that the EMM perhaps did not do a very good job. Accordingly, an aggregated score derived from such similarity metrics (such as the mean similarity score for all the text sequence pairs considered) may be used as an indicator of the quality of the candidate EMM.

In some embodiments in which the TE model is used for evaluation, an entailment score may be generated for various (premise, hypothesis) pairs associated with the output of a candidate EMM, where the premise is a source text sequence which was identified as evidence for a text sequence of a corresponding summary, and the hypothesis is the text sequence of the corresponding summary. If the TE model indicates that in most cases, the entailment score for the hypothesis given the premise is high (that is, that the hypothesis in general follows from the corresponding premise), this may also indicate that the EMM was effective in generating the evidence mappings. If the entailment scores are not very high, this may indicate that the EMM did not do a very good job regarding presenting evidence for the generated summaries. Thus, in some embodiments, a quality metric for a candidate EMM may be generated using such results obtained from a TE model. In some cases, results of both the QG/QA models and the TE model may be used to evaluate an EMM, e.g., with a weighted average of the quality scores produced by both techniques being used as the final quality score. The evaluation results, along with explanations of the evaluation results (such as the underlying similarity scores and corresponding questions and answers in the QG/QA approach, and/or the underlying entailment scores and the corresponding premise/hypothesis pairs in the TE approach) may be presented via programmatic interfaces 177 to clients of the AS in some embodiments. In various embodiments, from among a set of candidate EMMs, the particular candidate EMM whose evaluation results are the best may be chosen for deployment to production, and then executed to perform inference with respect to new input (such as for preparing transcripts of new conversations). The execution of the EMMs may be orchestrated by one or more model execution coordinators 137 in the depicted embodiment.

In some embodiments, programmatic interfaces 177 may also be used by AS clients to submit requests or preferences of several kinds pertaining to LLMs and other models, and to receive corresponding responses from the service. For example, a client may provide fine-tuning data set examples via the interfaces, or preferences regarding the automated evaluation techniques to be employed to select among a specified plurality of EMMs.

Various services of the provider network may utilize the resources of other services in some embodiments. For example, training coordinators and/or model execution coordinators of the AS may be implemented using some combination of hardware and software of one or more computing servers 105 (e.g., computing servers 105A, 105B, 105C or 105D) of the VCS in one embodiment. Model pre-training data, fine-tuning data and/or trained models may be stored using storage servers of the database/storage service 123 in one embodiment, such as SS 125A, 125B, 125C or 125D. In some embodiments, for some types of computations performed at the AS (such as parallelized pre-training or parallelized fine-tuning of LLMs), server clusters 149 managed by cluster managers 150 of the parallel processing service 171 may be used, and so on. When invoking the functionality of one service from another, programmatic interfaces 177 implemented by the service whose functionality is being requested may be utilized in various embodiments.

Figure 2:
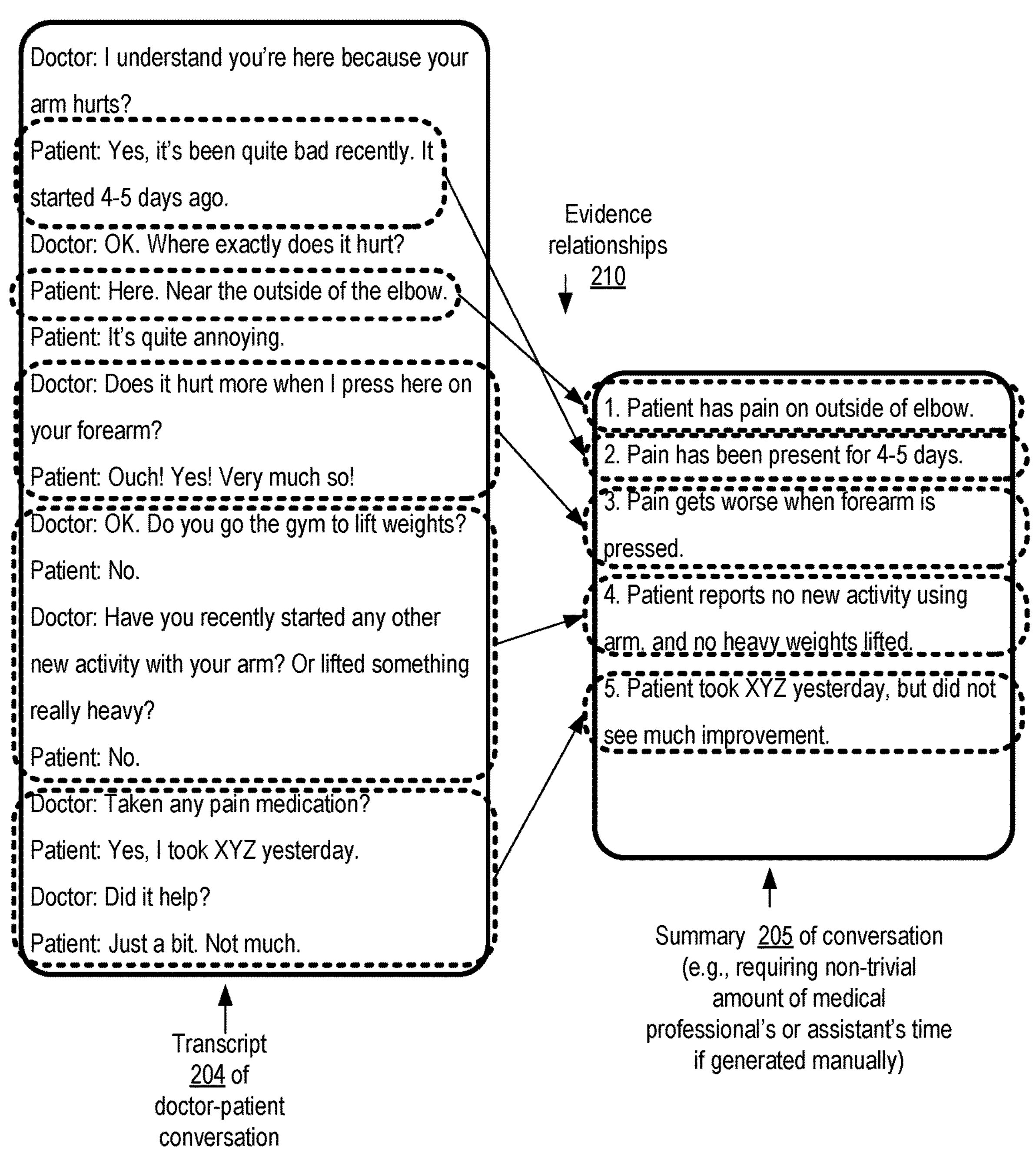
FIG. 2 illustrates example evidence relationships between a summary of a doctor-patient conversation and a transcript of the conversation, according to at least some embodiments.

As indicated above, in at least some embodiments LLMs may be utilized to generate annotated summaries of conversations or dialogs related to any of several problem domains. FIG. 2 illustrates example evidence relationships between a summary of a doctor-patient conversation and a transcript of the conversation, according to at least some embodiments. The transcript 204 shows several turns of a conversation between a doctor and a patient, in which the doctor is trying to determine details of a health problem being experienced by the patient. The patient's arm appears to be hurting near the elbow, with the pain getting worse if a part of the forearm is pressed. The doctor asks about possible causes of the pain, and whether the patient has taken any medicine.

From the conversation, a summary 205 may have to be generated and stored, e.g., as part of the medical records maintained by the doctor's office or hospital in the depicted embodiment. Ideally, the transcript should report on the facts of the patient's health concern, as indicated in various portions of the conversation, while eliding aspects of the conversation which are not necessarily germane (such as the patient's statement "It's quite annoying"). The summary may have to comply with relevant standards of the health care industry and applicable laws in some cases. In many cases in which automated summarization tools are not used, the summaries may have to be manually produced by the doctor or an assistant, which can take some effort and time that could otherwise be used to treat additional patients or spend more time listening to various patients.

In the example of FIG. 2, evidence relationships or mappings are shown between various sentences included in the summary 205, and the portions of the conversation from which those sentences were logically derived. For example, the summary sentence "Pain has been present for 4-5 days" is mapped at least in part to the evidence sentence "It started 4-5 days ago" uttered by the patient in the conversation. Such evidence relationships may at least in some cases not be included in summaries that are created manually. However, in scenarios in which tools such as LLMs are used for summarization, it may be important to indicate the evidence, as this may help avoid errors in the summaries, and may also lead to increased trust in the tools. An objective 210 of a technique for reducing the conversation summarization-related workload of medical professionals in the depicted embodiment may be to automatically generate summaries with annotations that indicate evidence mappings, thereby reducing the effort required by conversation participants or assistants, while reducing the probability of errors or hallucinations in the summary.

Figure 3:
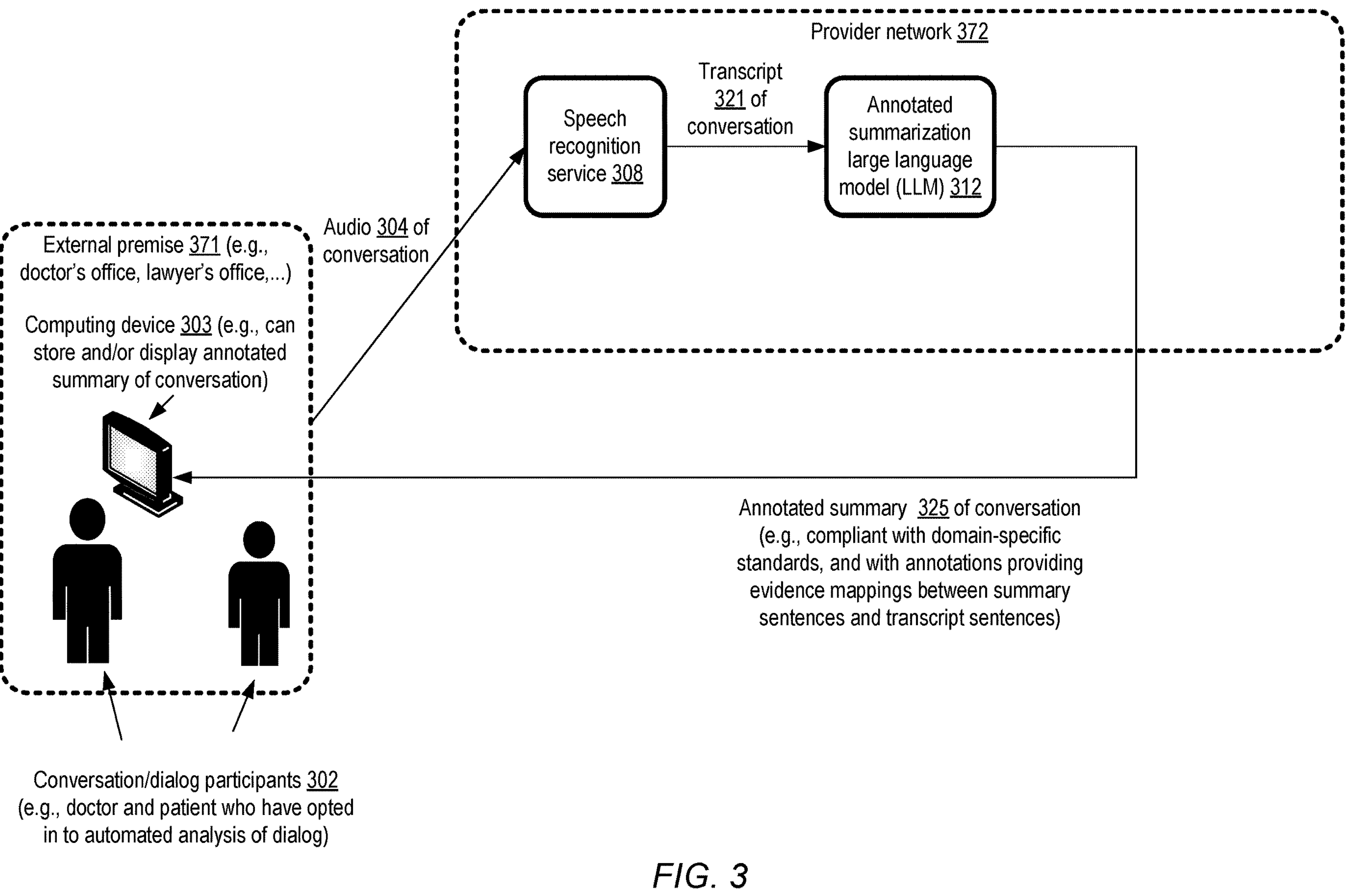
FIG. 3 illustrates an example workflow for generating annotated summaries of conversations using an LLM of a cloud-based analytics service, according to at least some embodiments.

FIG. 3 illustrates an example workflow for generating annotated summaries of conversations using an LLM of a cloud-based analytics service, according to at least some embodiments. In the example scenario depicted in FIG. 3, an annotated summarization LLM 312 executed using resources of a provider network 372 may be used to generate summaries of conversations that take place at locations outside the provider network. For example, conversation/dialog participants 302 may talk to each other in an external premise 371 (i.e., a premise external to the data centers of the provider network), such as a doctor's office, a lawyer's office and the like. The participants 302 may explicitly opt in to the automated summarization of their discussion in the depicted embodiment. For example, the participants may grant permission, via programmatic interfaces and/or via paper forms, for the recording, transmission and summarization of the dialog in advance of the commencement of the dialog.

A representation of the audio 304 of the conversation may be transmitted in the depicted embodiment from the external premise to resources of a speech recognition service 308 of the provider network. At this service, one or more ASR programs or models may be used to generate a transcript 321 of the conversation; in some cases, the transcript may be generated in real time, as additional fragments of the conversation are collected. The transcript 321 may be provided (along with an instruction prompt requesting creation of an annotated summary comprising evidence mappings) as input to a fine-tuned LLM 312. An annotated summary 325, compliant with domain-specific standards, may be generated by the LLM in the depicted embodiment. The annotations of the summary may provide evidence mappings between sentences (or text sequences other than sentences) included in the summary, and corresponding sentences (or text sequences) in the transcript which provide evidence or support for the summary sentences. In at least some embodiments the annotated summary may be generated in real time as well. In one embodiment, the annotated summary may be sent to one or more computing devices 303 at the external premise, where the summary may be stored and/or displayed if desired.

Figure 4:
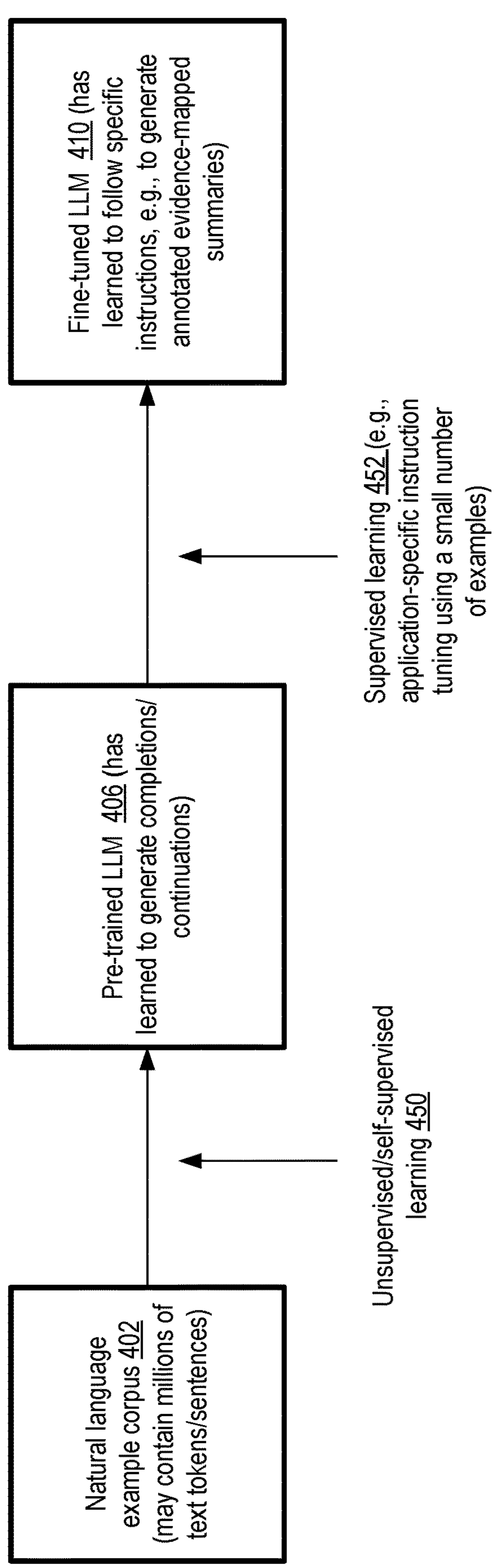
FIG. 4 illustrates an overview of the phases of training an LLM, according to at least some embodiments.

As indicated earlier, the process of training an LLM typically includes several phases or stages. FIG. 4 illustrates an overview of the phases of training an LLM, according to at least some embodiments. In the first phase, referred to as pre-training, a large natural language corpus 402 may be used for unsupervised or self-supervised learning 450. The pre-trained version of the LLM 406 may learn to generate completions or continuations for sequences of input text. For example, given a sequence of text tokens T1, T2, T3, T4, . . . , Tn, the pre-trained LLM may have learned enough from the large natural language example corpus to come up with good choices for a subsequent set of tokens Tn+1, Tn+2, etc.

For some types of tasks, pre-trained LLMs may be sufficient without any further training. However, for many specialized tasks, such as the generation of annotated summaries of doctor-patient conversations, a second phase of training referred to as fine-tuning may be needed to make the LLM capable of performing the tasks at a target level of quality. This second phase may comprise supervised learning 452, in which a small number of labeled examples provided as input to the pre-trained LLM may in some cases be combined with respective instructions or directions as to what is expected from the LLM. The fine-tuned LLM 410 obtained as a result may have learned to follow specific instructions such as generating annotated summaries comprising evidence mappings of the kind introduced above. Note that in some embodiments, there may be additional phases of the overall training process—e.g., in a pre-fine-tuning phase, the LLM may learn to follow a variety of types of instructions, before it is finally tuned to follow a specific type of instruction.

Figure 5:
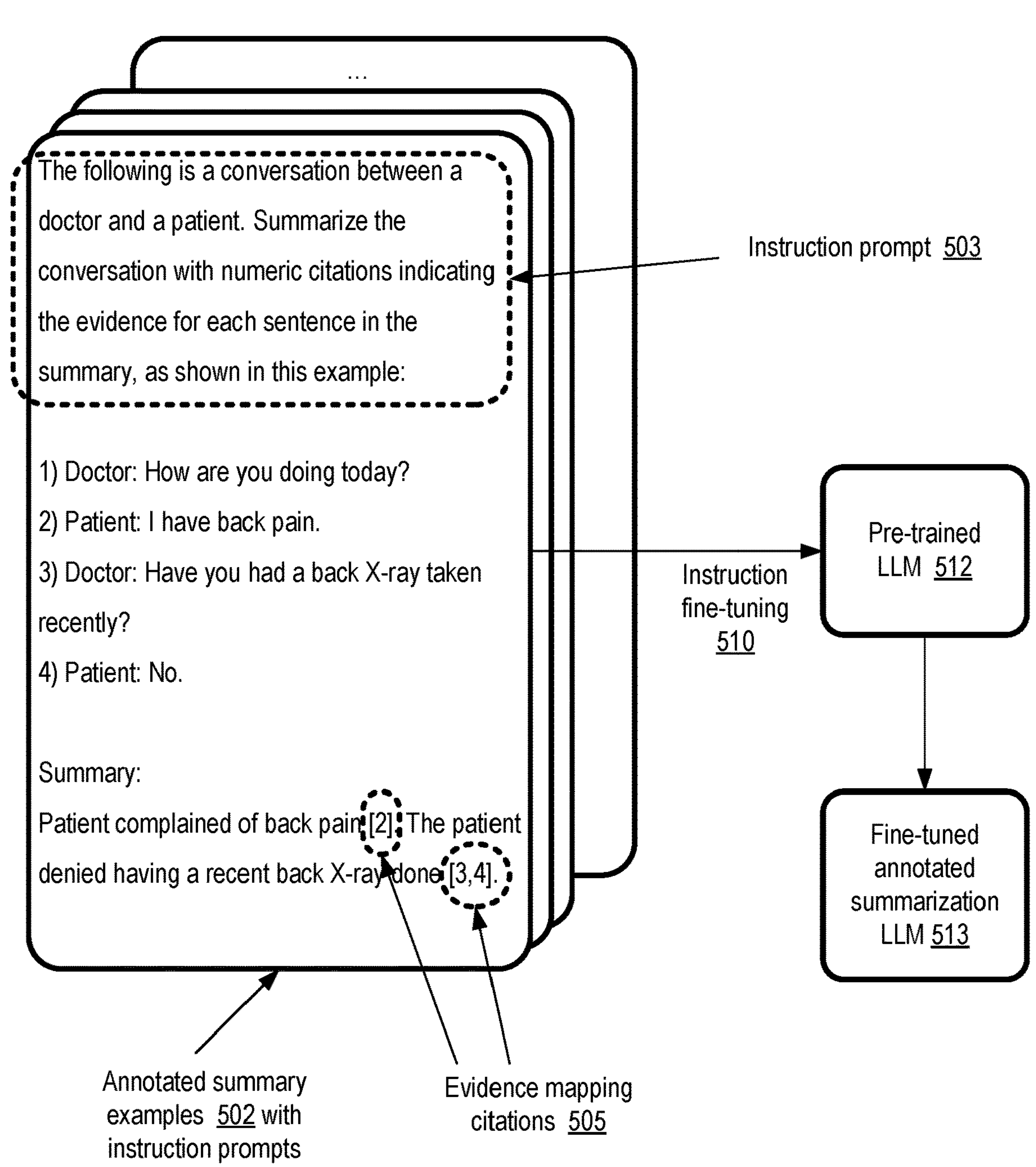
FIG. 5 illustrates an example input record which may be used for instruction fine-tuning of a pre-trained LLM to obtain an annotated summarization LLM that provides evidence for its summaries of conversations, according to at least some embodiments.

FIG. 5 illustrates an example input record which may be used for instruction fine-tuning of a pre-trained LLM to obtain an annotated summarization LLM that provides evidence for its summaries of conversations, according to at least some embodiments. In the depicted embodiment, a set of annotated summary examples 502, at least some of which include instruction prompts may be used for instruction fine-tuning 510 of a pre-trained LLM 512. A given instruction prompt 503 included in one of the examples may provide guidance in natural language to the pre-trained LLM, such as "summarize the conversation with numeric citations indicating the evidence for each sentence in the summary".

After the instruction prompt, a transcript of a conversation may be presented in the example in some embodiments, with the different turns of the conversation being labeled with numeric identifiers or numerals that can be used in the citations. For example, the first turn in the conversation in the depicted example, in which a doctor says "How are you doing today?" to a patient may be labeled "1)", the response turn from the patient in which the patient indicates back pain may be labeled "2)", and so on. Note that in some embodiments, a different scheme may be used to label the portions of the conversation—e.g., instead of integers, alphabet letters such as "a", "b", "c", etc. may be used, Roman numerals such as "I", "II", "III" or "i", "ii", "iii" may be used, and so on. In at least one embodiment, preferences regarding the label format or syntax (e.g., whether integer labels are to be used, alphabetic labels are to be used etc.) may be indicated, e.g., by a client on whose behalf the LLM is being prepared, via programmatic interfaces of an analytics service at which the instruction fine tuning is performed. At the end of the example, a summary of the transcript which includes evidence mapping citations 505 may be included in the depicted embodiment. For example, the citation [2] at the end of the summary sentence "Patient complained of back pain" may indicate that the evidence for that summary sentence is provided by the sentence with the label "2)" in the transcript, and so on. Note that in some cases a summary sentence may have multiple citations (such as "[3, 4]") of evidence sentences within the transcript; as such, in general, any number of citations or evidence pointers may be included in the annotations of the summary.

The pre-trained LLM 512 may consume the annotated summary example input records and learn the details (including the output format for the evidence mapping citations) of the task it is expected to perform. The fine-tuned annotated summarization LLM 513 obtained as a result of the instruction fine-tuning 510 may be able to generate annotated summaries in a similar format as that presented in the examples. Note that for an inference request, only an instruction prompt and a labeled transcript may be provided as input to the fine-tuned annotated summarization LLM in various embodiments, and the annotated summary may be generated by the LLM in response to the inference request.

Figure 6:
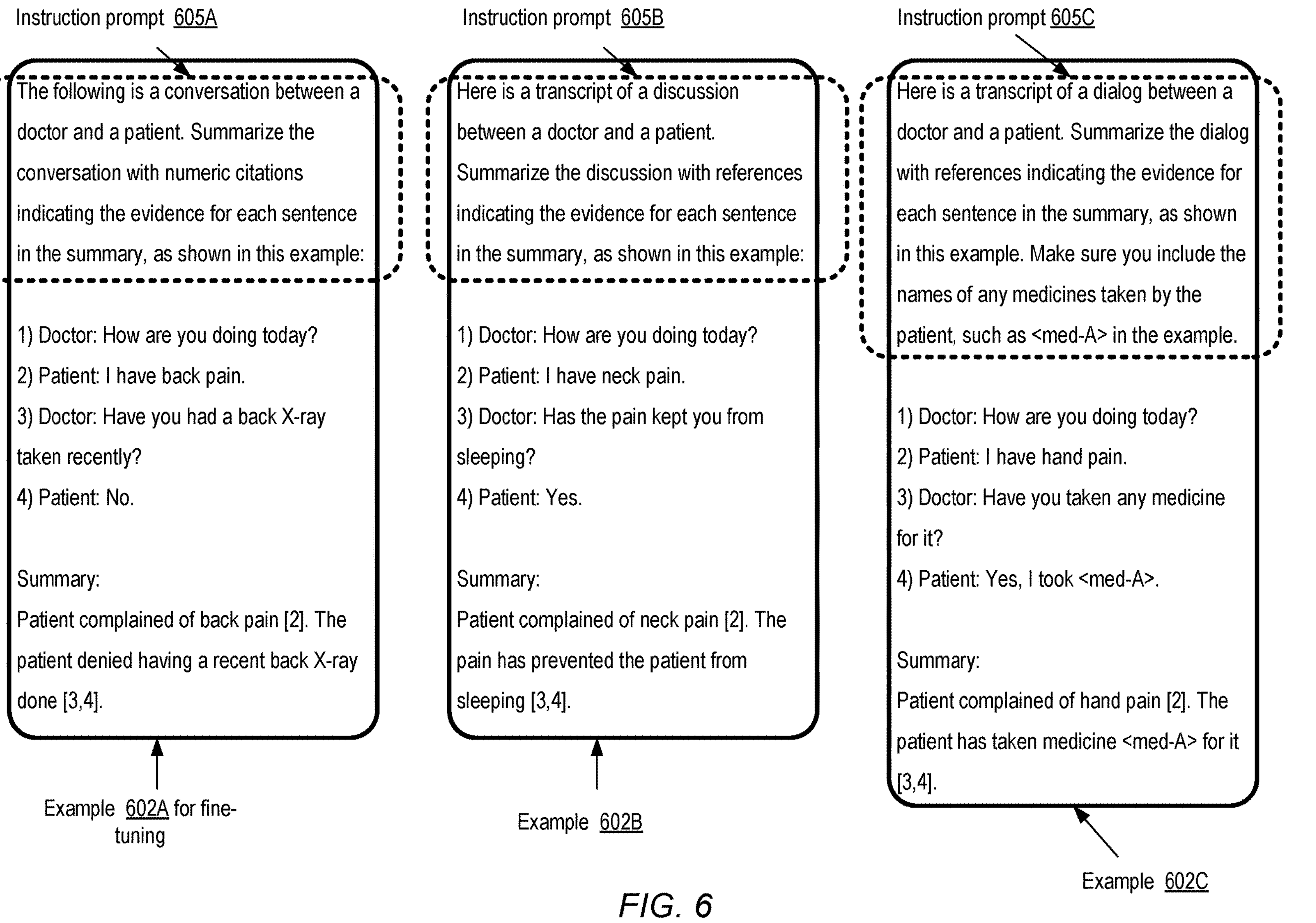
FIG. 6 illustrates examples of instruction prompt variants which may be used during instruction fine-tuning of an LLM for annotated summarization, according to at least some embodiments.

In some embodiments, the instruction prompts included in the examples used as input for fine-tuning an LLM may be identical across all the examples. In other embodiments, somewhat different instruction prompts may be used for the different examples. This approach may in some cases may help generalize the LLM and make it more likely to be able to generate the desired output even if an inference request happens to use an instruction prompt that the LLM has not encountered during training. FIG. 6 illustrates examples of instruction prompt variants which may be used during instruction fine-tuning of an LLM for annotated summarization, according to at least some embodiments.

In the first example 602A used as input for fine-tuning the LLM, the instruction prompt 605A begins with the sentence "The following is a conversation between a doctor and a patient". In the second example 602B, a slight variant of this language is used in the instruction prompt 605B: "Here is a transcript of a discussion between a doctor and a patient"; similarly, in the third example 602C, another variant 605C of the instruction prompt begins with the sentence "Here is a transcript of a dialog between a doctor and a patient". Similarly, the next sentence in each instruction prompt variant, indicating what the LLM is expected to provide, also varies somewhat. Such variations may in effect teach the LLM that the instructions provided to it in inference requests may not all be identical, even if they all have similar meanings and require the generation of the same kind of output in the same output format.

In some embodiments, to help further ensure that all relevant facts in the transcripts are included in the generated summaries, and that hallucinations are thereby minimized, the instruction prompts regarding summaries may be made even more specific to the problem domain or use case for which the LLM is intended. For example, in the third example 602C of FIG. 6, the instruction prompt includes the sentence "Make sure you include the names of any medicines taken by the patient, such as <med-A> in the example". In some embodiments, such specific prompt sentences may be automatically generated at the analytics service for all the doctor-patient conversation examples in which patients mention specific medicines (as in the statement "Yes, I took <med-A>"). As in the scenario shown in FIG. 6, in some embodiments keywords such as proper nouns (if any) may be extracted from the transcripts and mentioned in the instruction prompts in some embodiments to ensure that relevant information is included in the summary generated by the fine-tuned version of the LLM. In other embodiments, suck keyword-based instruction prompt sentences may not be used.

Figure 7:
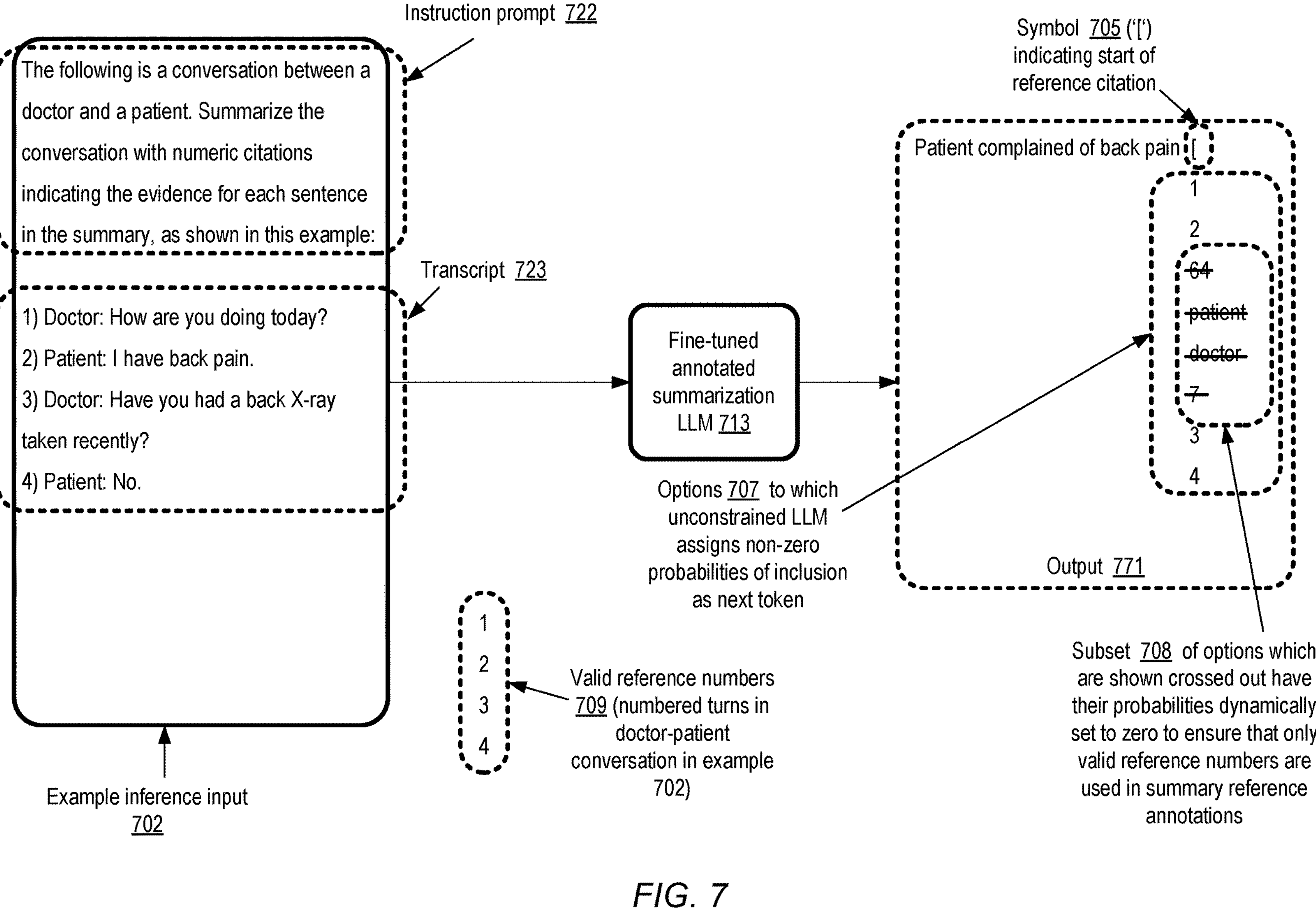
FIG. 7 illustrates an example scenario in which a portion of LLM output used for indicating evidence for summary contents may be constrained during inference, according to at least some embodiments.

In some embodiments, a technique referred to as constrained decoding may be employed to reduce the probability of errors in the evidence indicator annotations generated during inference. FIG. 7 illustrates an example scenario in which a portion of LLM output used for indicating evidence for summary contents may be constrained during inference, according to at least some embodiments. In the depicted scenario, example inference input 702 provided to a finetined annotated summarization LLM 713 may comprise an instruction prompt 722 and a transcript 723. The transcript 723 may comprise four turns of a conversation between a doctor and a patient, with turns 1 and 3 comprising respective sets of words uttered by the doctor, and turns 2 and 4 comprising respective sets of works uttered by the patient. Assume that the evidence annotations included in a summary generated for the example inference input 702 are to be expressed using numeric citations to one or more turns of the conversation represented in the transcript. As such, when it comes to providing transcript-based evidence for respective sentences or text sequences of a generated summary, the valid reference numbers 709 in this example would comprise the set of turn numbers (1, 2, 3 and 4).

During the process of generating the annotated summary, the LLM may have produced the following text sequence output 771 "Patient complained of back pain" followed by the symbol 705 (the left bracket which indicates the start of a numeric citation as evidence) at the point of time depicted in FIG. 7. In at least some embodiments, at every time-step at which a next text token (which may be a single character or multiple characters) is to be generated, the fine-tuned LLM may use respective probability distributions associated with various such tokens that it has learned as part of its vocabulary to select the particular next language element. At the time that the token after the symbol 705 is to be generated, which should ideally comprise an annotation as a numeric reference to one or more of the turns in the transcript, the set of candidate next vocabulary tokens whose probability distributions are being considered may include several tokens that are not in the valid set of turn numbers (1, 2, 3, and 4). For example, the options 707 to which an unconstrained version of the fine-tuned LLM may assign non-zero probabilities of inclusion as the next token may include (1, 2, 64, patient, doctor, 7, 3, 4). This means that if no constraints are placed on the output, there is in turn a non-zero probability that the next token after the "[" symbol in the output 771 may be 64, patient, doctor, or 7, none of which would be a valid numeric reference to a conversation turn included in the transcript.

To avoid such invalid evidence mappings, in the depicted embodiment, the output of the LLM may be programmatically constrained by the analytics service at which the LLM is being executed to perform inference on the input 702. A subset 708 of the candidate options 707 (namely 64, patient, doctor and 7, each of which is shown crossed out with a strikethrough symbol) which do not belong the set of valid reference numbers 709 may have their probabilities dynamically set to zero to ensure that only the valid reference numbers are used in summary reference annotations. This technique may be referred to as constrained decoding in some embodiments. In various embodiments, applying this technique for a fine-tuned annotated summarization LLM may comprise determining, prior to generation of an annotated summary of a given transcript during inference, a set of valid annotation options (such as 1, 2, 3 and 4 in the example of FIG. 7) for indicating evidence for that annotated summary. The technique may also comprise programmatically constraining the LLM to include, when performing inference computations used to generate the annotated summary, no other annotation options than members of the set of valid annotation options. Employing this technique may lead to further reductions in hallucinations in the output of the LLM than would be achieved without using the technique—e.g., the probability of nonsensical evidence annotations/mappings would be reduced. In some embodiments, such constraint techniques may not be employed.

Figure 8:
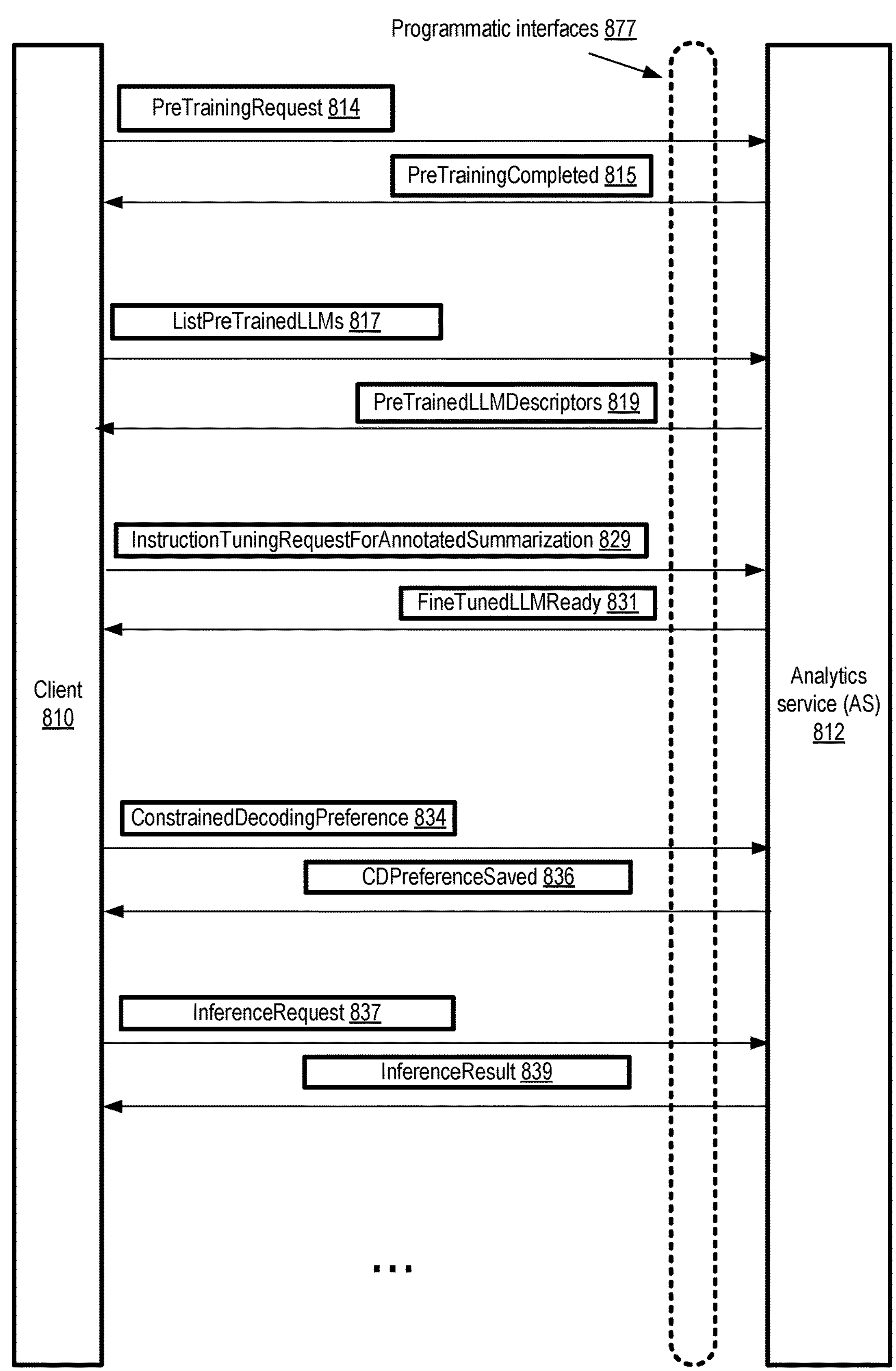
FIG. 8 illustrates example programmatic interactions pertaining to the preparation and use of an annotated summarization LLM between clients and an analytics service, according to at least some embodiments.

FIG. 8 illustrates example programmatic interactions pertaining to the preparation and use of an annotated summarization LLM between clients and an analytics service, according to at least some embodiments. An analytics service (AS) 812, similar in features and functionality to AS 133 of FIG. 1, may implement a set of programmatic interfaces 877 usable by clients 810 of the AS to submit various kinds of requests and preferences pertaining to LLMs, and to receive corresponding responses. In embodiments in which the LLMs are to be used for annotated summarization of doctor-patient conversations, for example, the clients may include technical staff of hospitals, clinics or doctors' offices. The programmatic interfaces 877 may for example include one or more web-based consoles, command-line tools, application programming interfaces (APIs), graphical user interfaces and the like.

In the embodiment shown in FIG. 8, a client 810 may submit a PreTrainingRequest 814 via programmatic interfaces 877 to initiate the pre-training of a new LLM. The request may, for example, indicate one or more input corpuses to be used for the pre-training, the size of the target LLM (e.g., in millions or billions of parameters to be learned), a set of hyper-parameters of the pre-training (including for example termination criteria for the pre-training phase), and so on. The pre-training may be initiated at the AS, and a PreTrainingCompleted response 815 may be sent to the client 810 in some embodiments when the pre-training phase is completed.

In at least one embodiment, the AS may enable clients to request the fine tuning of any of several pre-trained LLMs made accessible by the AS, such as pre-trained LLMs registered at the AS by one more third-party LLM providers, LLMs pre-trained by the operator of the provider network at which the AS is implemented, and so on. A client may submit a ListPreTrainedLLMs request 817 to view names and properties of the available LLMs. Descriptors of the pre-trained LLMs, indicating for example the names of the LLMs, the entities or organizations who produced the LLMs, the sizes of the LLMs, the problem domains for which the LLMs are recommended, and so on, may be provided by the AS to the client via one or more PreTrainedLLMDescriptors messages 819 in the depicted embodiment.

A client may select a particular pre-trained LLM (e.g., one that was pre-trained in response to a PreTrainingRequest submitted earlier, or one of a set of pre-trained LLMs available from other sources at the AS), and request that that LLM be fine-tuned at the AS for a particular use case in the depicted embodiment. For example, an Instruction TuningRequestForAnnotatedSummarization request 829 may be sent to the AS via programmatic interfaces 877, requesting that a specified pre-trained LLM be fine-tuned to generate the kinds of annotated summaries discussed above. The request 829 may indicate a set of fine-tuning input records, each comprising an instruction prompt, a source text collection such as a transcript of a doctor-patient conversation, and an annotated summary which included evidence mappings indicating the portions of the source text that comprise evidence for various subsets of the summary. The pre-trained LLM may be fine-tuned in response to the request, and a FineTunedLLMReady message 831 may be sent to the client in some embodiments when the fine-tuning is completed.

In at least some embodiments, a client 810 may indicate a preference for whether constraints of the kind discussed in the context of FIG. 7 should be applied during inference, e.g., to reduce the probability of erroneous evidence mappings. A ConstrainedDecodingPreference message 834 may be sent to the AS indicating whether such constraints should be used for a given fine-tuned LLM. The AS may send a CDPreferenceSaved response message 836 to the client indicating that the preferences have been saved in a metadata repository of the AS and will be implemented during inference going forward.

An InferenceRequest 837 may be submitted to the AS to produce an annotated summary for a particular transcript indicated in the request (in accordance with an instruction prompt included along with the transcript), or to implement similar text analysis tasks for other kinds of use cases and text collections in the depicted embodiment using a fine tuned LLM. The source text indicated in the inference may be provided as input to the specified LLM, and the result generated by the LLM may be provided to the client via one or more InferenceResult messages 839 in some embodiments. In at least some embodiments, programmatic interactions other than those shown in FIG. 8 may be supported with regard to the preparation and use of LLMs of an AS.

In at least one embodiment, fine-tuned LLMs of the kind described herein may be employed by one or more domain-specific services implemented at a cloud provider network, such as a health care information management service (HCIMS) whose clients may include hospitals, clinics, doctors' offices and the like. In such an embodiment, one or more LLMs may be pre-trained and fine-tuned for a given domain specific service, such that the end users of the service (such as the doctors for whose conversations annotated summaries are generated) do not have to deal with the phases of LLM preparation. For example, an administrator of an HCIMS may send at least some of the kinds of client requests shown in FIG. 8 to an AS 812. Inference requests may be generated automatically in the form of transmissions of audio of conversations that take place at the premises of the clients of the HCIMS in some scenarios, and inference results in the form of corresponding annotated transcripts may be provided automatically, without the HCIMS clients necessarily being made aware of any details of the models being used in some embodiments. In at least some embodiments, easy-to-use graphical user interfaces may be implemented to enable the clients to view annotated summaries, for example with visual cues such as font colors or arrows showing evidence mappings for various subsets of the summaries.

Figure 9:
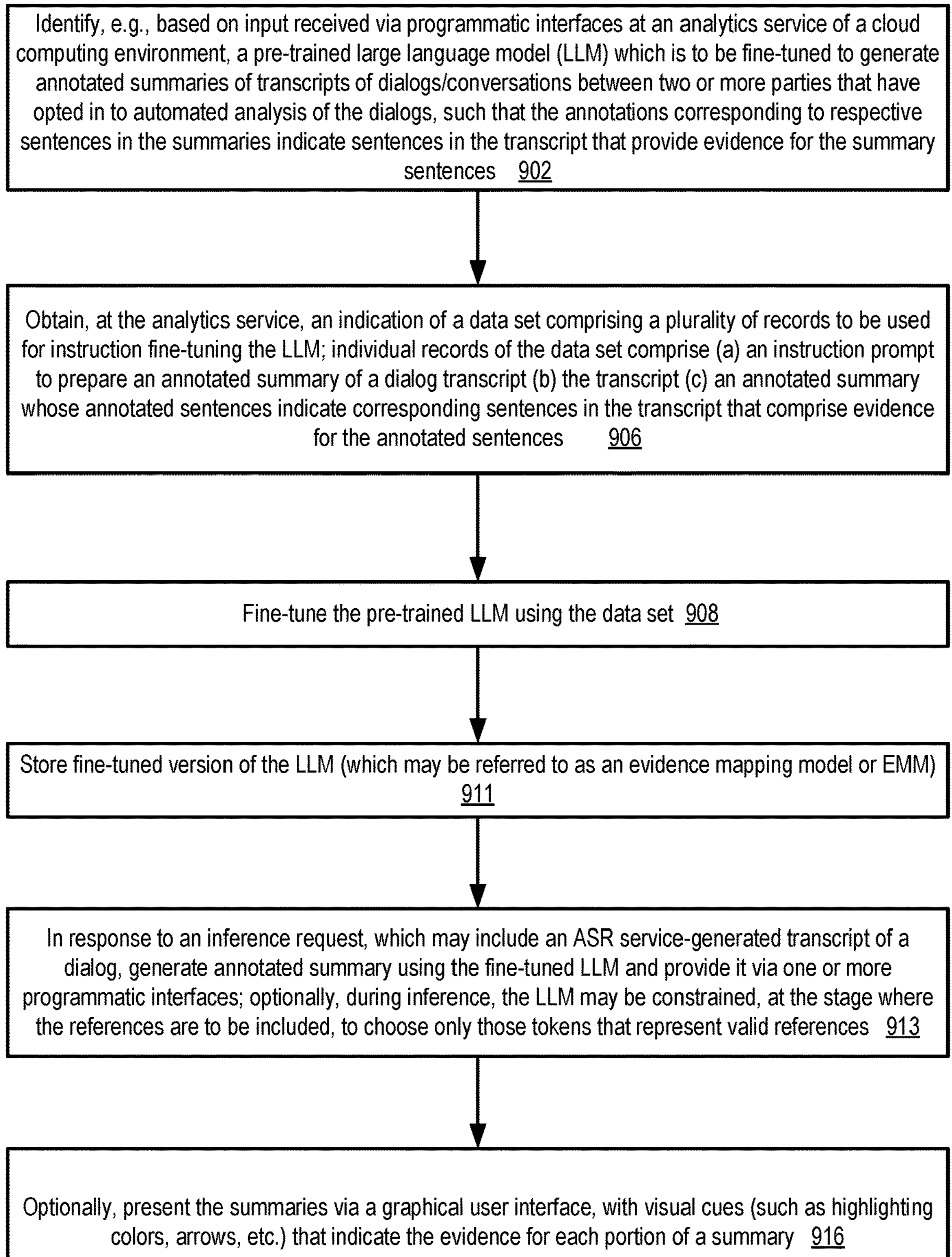
FIG. 9 is a flow diagram illustrating aspects of operations which may be performed to train an LLM that can summarize conversations and also provide evidence for the contents of generated summaries, according to at least some embodiments.

FIG. 9 is a flow diagram illustrating aspects of operations which may be performed to train an LLM that can summarize conversations and also provide evidence for the contents of generated summaries, according to at least some embodiments. As shown in element 902, a pre-trained LLM which is to be fine-tuned and then used to generate annotated summaries of transcripts of dialogs/conversations between two or more parties may be identified, e.g., based on input received via programmatic interfaces at a an analytics service of a provider network or cloud computing environment. The annotations corresponding to respective sentences (or more generally, text token sequences) in the summaries are to indicate corresponding sentences (or text sequences) in the transcript which provide evidence for the summary sentences.

An indication of a data set comprising a plurality of records to be used for instruction fine-tuning the pre-trained LLM may be obtained at the analytics service (element 906) in the depicted embodiment. Individual records of the data set may comprise (a) an instruction prompt requesting preparation of an annotated evidence-providing summary of a dialog transcript (b) the transcript (c) an annotated summary whose annotated sentences indicate corresponding sentences in the transcript that comprise evidence for the annotated sentences in the depicted embodiment.

Using at least a portion of the data set, the pre-trained LLM may be fine-tuned at the analytics service in various embodiments (element 908). A fine-tuned version of the LLM (which may also be referred to as an instruction-tuned version of the LLM) may be stored at a repository of the analytics service in at least some embodiments (element 911). The fine-tuned version of the LLM may represent one example of an evidence mapping model (EMM), in that the annotations it generates represent mappings between text included in the summaries and corresponding evidence in the source text (the transcripts) from which the summaries are generated.

In response to an inference request indicating a transcript of a dialog, an annotated summary may be generated using the fine-tuned LLM version (element 913) in various embodiments, and provided to one or more destinations via programmatic interfaces. In some embodiments, the transcript itself may be generated at the provider network, e.g., by an ASR service to which audio of the dialog is transmitted from the premise at which the dialog occurs. In one embodiment, the LLM may be constrained during inference (e.g., using techniques similar to those discussed in the context of FIG. 7), at the stage where the annotations comprising references to the source transcript are generated, to choose only those tokens that represent valid references.

Optionally, in some embodiments, the generated annotated summaries may be presented via graphical user interfaces, with visual cues (such as highlighting colors, font colors, arrows linking summary sentences to source transcript sentences, etc.) that indicate the respective evidence for each portion of the summary (element 916).

Note that instruction-tuning based techniques for LLMs to enable the presentation of evidence for various portions of the LLMs' outputs may be utilized for applications other than text summarization. The dialog transcripts may thus represent just one type of source text token sets which can serve as evidence. For example, in a different application, the source set of text tokens to be analyzed may comprise a nonfiction or fiction narrative or article, and the instruction prompt may comprise one or more questions about the content of the source set. The annotated analysis result of a question-answering LLM used in such an application may indicate (a) the answers to the questions and (b) evidence mappings for various answers or answer portions, pointing to portions of the source set which justify the answers. As such, the techniques discussed in the context of FIG. 1-FIG. 9 may be generalized to a variety of applications and use cases in various embodiments, and is not restricted to conversation summarization applications. Even within the general category of conversation summarization, a variety of conversation types may be analyzed using an annotated summarization LLM of the kind introduced above, such as conversations between doctors and patients, conversations between lawyers and clients, interviews between journalists and various entities, and so on.

Figure 10:
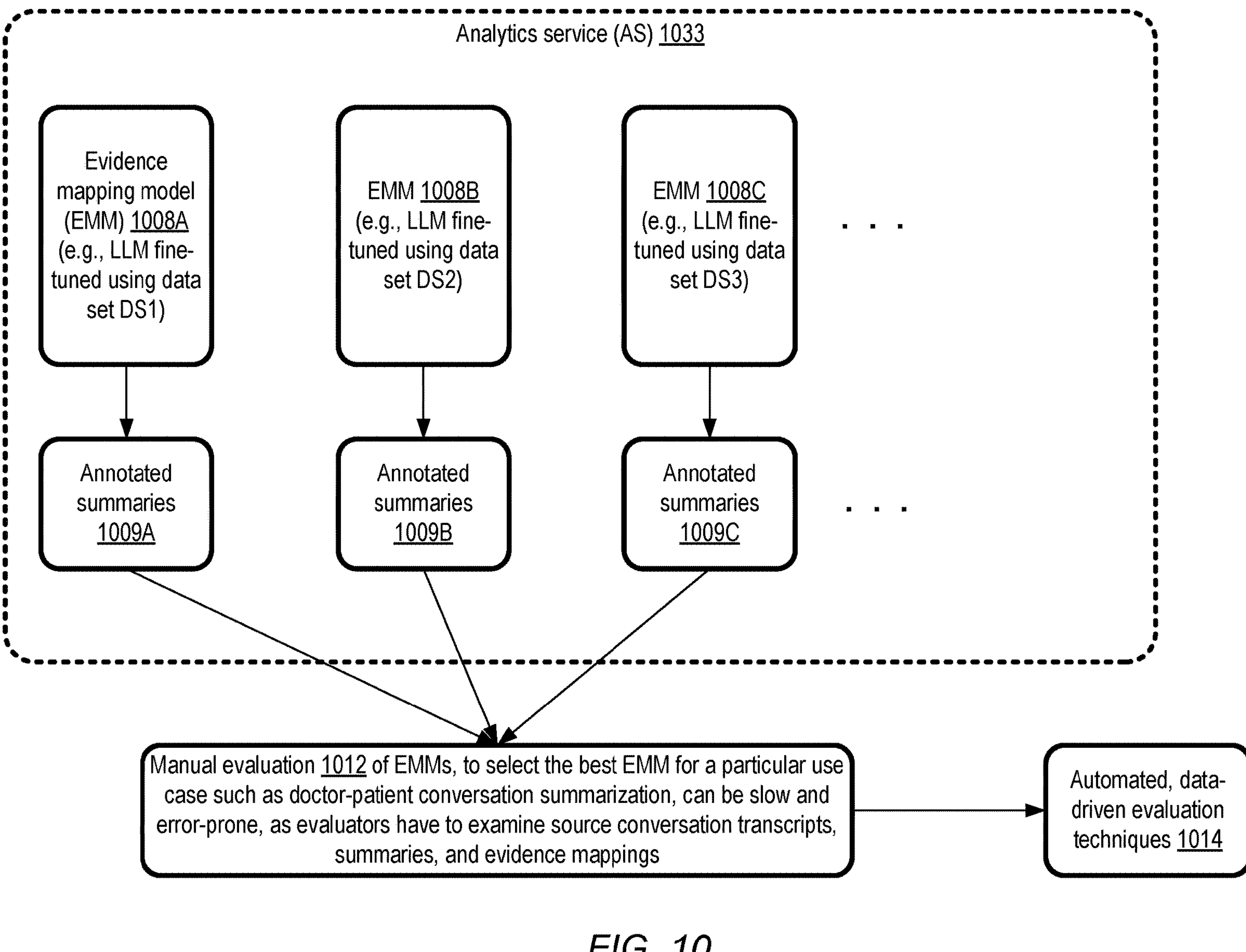
FIG. 10 illustrates an example scenario in which the quality of multiple evidence mapping models of an analytics service may have to be evaluated, according to at least some embodiments.

FIG. 10 illustrates an example scenario in which the quality of multiple evidence mapping models of an analytics service may have to be evaluated, according to at least some embodiments. In the embodiment depicted in FIG. 10, several different EMMs may be available at an analysis service (AS) 1033 for a particular kind of application, such as summarization of doctor-patient conversations. For example, EMM 1008A may comprise an LLM which was fine-tuned or instruction-tuned using a data set DS1, EMM 1008B may comprise a second LLM which was fine-tuned using a data set DS2, and EMM 1008C may comprise a third LLM which was fine-tuned using a data set DS3. Corresponding to each of the EMMs, a respective set of annotated summaries generated by that EMM (similar in content to the kinds of annotated summaries discussed above) may be available, which may potentially be used to evaluate the quality of the EMMs. For example, annotated summaries 1009A may have been produced for a given set of dialog transcripts by EMM 1008A, annotated summaries 1009B may have been produced by EMM 1008B, and annotated summaries 1009C may have been produced by EMM 1008C.

Unlike many machine learning techniques, for which quality evaluation metrics and automated evaluation techniques have been in common use in the industry for some time, standardized metrics for judging the quality of the evidence mappings produced by such EMMs may not be easily available. Accordingly, to determine which of the available EMMs is likely to perform best for a given use case (such as the generation of annotated summaries of doctor-patient conversations), manual evaluation 1012 may be chosen as an option in some scenarios. However, such manual evaluation may be slow and error-prone, as the evaluators may have to painstakingly examine source conversation transcripts, generated summaries, and also the generated evidence mappings themselves. Accordingly, in at least some embodiments, one or more automated data-driven evaluation techniques 1014 for EMM evaluation may be employed.

FIG. 11 illustrates example automated techniques for evaluating evidence mapping models, according to at least some embodiments. In the embodiment depicted in FIG. 11, at least three automated EMM evaluation methodologies 1110 may be available or supported at an analytics service (AS). The first methodology may be question generation and answering (QG/QA or QGA) model-based evaluation 1115, the second methodology may comprise textual entailment (TE) model-based evaluation, and the third methodology may be ensemble-based evaluation 1125.

The intuition behind using the QGA methodology may be summarized as follows. Given a sentence of text, trained machine learning models (QG models) that can generate questions whose answers are indicated in the sentence may be available at the analytics service (AS). In addition, given a question and a sentence from which the question was generated, additional trained machine learning models (QA models) may also be available at the analytics service (AS). If an EMM provides mappings between a summary sentence SS and a corresponding evidence sentence ES in the source text for which the summary is generated, it may therefore be possible to (a) automatically generate a question Q from SS using the QG model, (b) automatically obtain a first answer A1 to Q by providing Q and SS to the QA model and (c) automatically obtain a second answer A2 to Q by providing Q ES to the QA model. Intuitively, if A1 and A2 are identical, or very similar, this suggests that the EMM is likely to have found the correct evidence for SS. If similarity scores of such answers are generated for numerous questions generated from respective sentences of the summary, and the average of the similarity scores is high, this may suggest that the EMM is of high quality.

The intuition behind using the TE methodology may be summarized as follows. Given a first sentence S1 as a premise, and a second sentence S2 as a proposed hypothesis, a trained TE model produces an indication, such as an entailment score, for the logical relationship between S1 and S2. A high entailment score may indicate that S2 is entailed by (logically follows from) S1, a very low entailment score may indicate that S2 is contradicted by S1, and a medium entailment score may indicate that the TE model is unable to conclude whether S2 follows from S1 or not. In some cases, a TE model may generate integer scores such as "1" to indicate that S2 is entailed by S1, "−1" to indicate that S2 is not entailed by S1, and "0" for the case where the extent of the entailment is unclear. The analytics service (AS) may have access to trained TE models in at least some embodiments, e.g., within a library of trained models that may also include QG and QA models. In at least one embodiment, one or more of the QG, QA and TE models may itself comprise a trained LLM. In order to estimate the quality of a given EMM in an automated manner using a trained TE model, the entailment scores or results of numerous pairs of sentences (or text collections) may be computed in some embodiments, with the evidence-mapped sentences designated as the premises and the corresponding summary sentences designated as hypothesis. If the averaged entailment scores indicate that in a high fraction of the sentence pairs analyzed, the summary sentences are in fact entailed by the corresponding source sentences that were cited as evidence (e.g., transcript sentences), this may suggest that the EMM has a high quality.

The intuition behind using ensemble-based evaluation 1125 may be summarized as follows. In general, a given machine learning methodology may not generalize equally well to all use cases, depending for example on the kinds of input that were used to train the models utilized in that methodology. Accordingly, if sufficient resources are available, it may make sense to obtain respective quality scores for a given EMM using both the QGA approach and the TE approach, and compute an overall quality score using an average (e.g., a weighted average) of the two scores. The weights assigned to the results from the different approaches may be chosen based on heuristics at the analytics service (AS) in some embodiments, which may in turn depend on the problem domain for which the EMM is going to be used. In at least one embodiment, a client of the analytics service (AS) on whose behalf the automated evaluation is to be performed for a set of candidate EMMs prior to selecting one of the EMMS for production use may specify or suggest the weights. Note that in some embodiments, methodologies that utilize models or tools other than the QG/QA models and other than the TE model may be available, and an ensemble approach may utilize such other models in addition to, or instead of, using the QG/QA or TE models.

Figure 12:
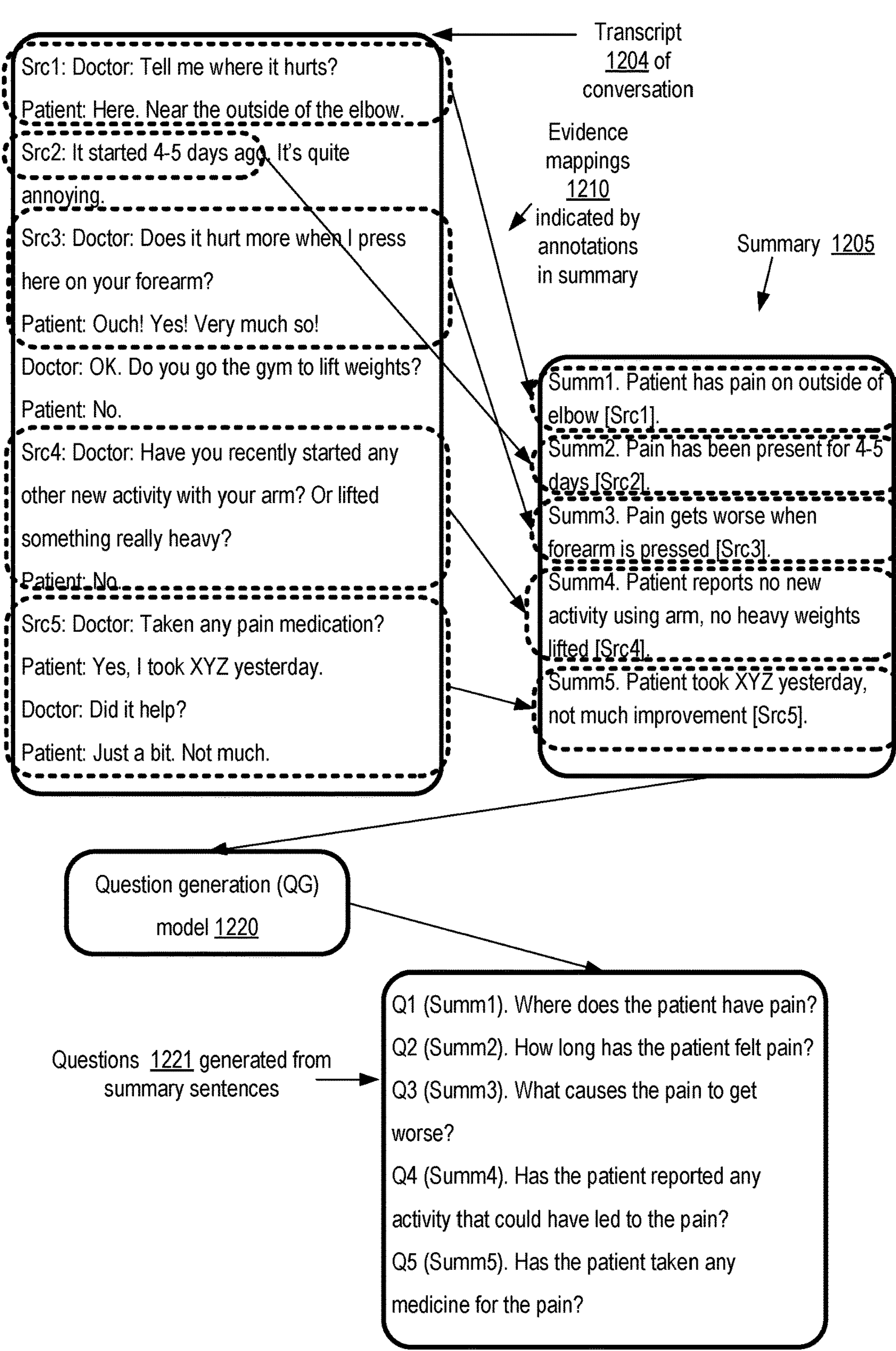
FIG. 12 and FIG. 13 collectively illustrate an example question generation and answering based technique for automating evaluation of evidence mapping models, according to at least some embodiments.
Figure 13:
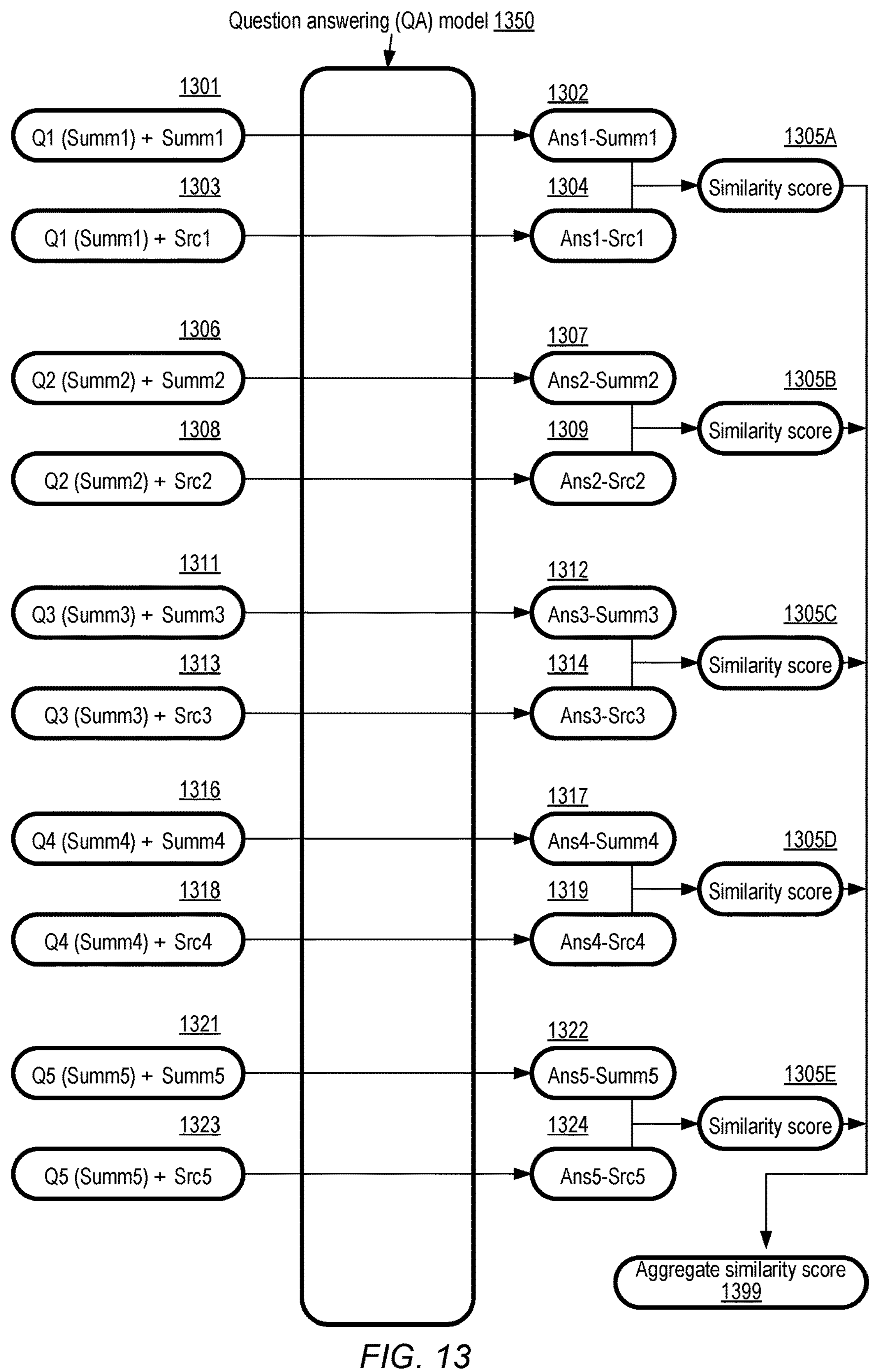

FIG. 12 and FIG. 13 collectively illustrate an example question generation and answering based technique for automating evaluation of evidence mapping models, according to at least some embodiments. An annotated summary 1205 may be generated from a transcript 1204 of a conversation between a doctor and a patient by an EMM (such as the annotated summarization LLMs discussed above) in the depicted embodiment. To simplify the discussion of the QGA technique, various portions of the source text (the transcript) have been labeled using strings beginning with "Src", such as Src1, Src2, etc., and various portions of the summary have been labeled using strings beginning with "Summ", such as Summ1, Summ2, etc. The summary portions are annotated to indicate the evidence relationships 1210 or evidence mappings to the source transcript, e.g., the string [Src1] at the end of Summ1 indicates that from the perspective of the EMM being used, Src1 provides evidence for Summ1. Similarly, the string [Src2] at the end of Summ2 indicates that Src2 provides evidence for Summ2, and so on.

In various embodiments, as part of a first stage of an EMM evaluation using a QGA methodology, one or more of the sentences or text sequences of the summary may be provided as input to a trained QG model 1220 at the analytics service (AS). The trained QG model may generate, corresponding to respective sentences or other text sequences of the summary, a set of questions 1221. For example, from Summ1, "Patient has pain on outside of elbow", question Q1 "Where does the patient have pain?" may be generated. The summary sentence from which each of the questions is generated is indicated in FIG. 12 by the bracketed annotation next to the question number (e.g., "Q2 (Summ2)" indicates that question Q2 was generated by the QG model from the summary sentence Summ2. Similarly, questions may be generated for respective other portions of the summary using the QG model in this stage of the QGA methodology. Note that in some embodiments, more than one question may be generated corresponding to each of the subsets of the summary generated by the candidate EMM which is going to be evaluated using the QGA methodology. In at least one embodiment, questions may be generated at a granularity other than sentence granularity—e.g., a single question may be generated from multiple sentences of a summary, a question may be generated from a subset of a sentence, and so on.

In a second stage of the QGA-based methodology, in at least some embodiments, two answers may be generated using a trained question answering (QA) model for at least some of the questions generated in the first stage. The second stage is illustrated in FIG. 13. The question Q1 generated by the QG model and shown in FIG. 12 may be included in two input records submitted to a QA model 1350, and a respective answer may be obtained from the QA model in the depicted embodiment. One of the input records, record 1301, may comprise Q1 and the corresponding summary sentence Summ1 from which Q1 was generated. The second of the input records, record 1303, may comprise Q1 and the evidence sentence Src1 for Summ1. From input record 1301, a first answer to Q1, Ans1-Summ1 1302, may be generated by the QA model. From input record 1303, a second answer to Q1, Ans1-Src1 1304, may be generated by the QA model. A similarity score 1305A may then be estimated or generated between the two answers 1302 and 1304. Similar pairs of answers may be obtained for other input record pairs comprising a respective generated question, such as answers 1307 and 1309 for input record pair 1306 and 1308 which contain Q2, answers 1312 and 1314 for input record pair 1311 and 1313 which contain Q3, answers 1317 and 1319 for input record pair 1316 and 1318 which contain Q4, and answers 1322 and 1324 for input record pair 1321 and 1323 which contain Q5. A respective similarity score 1305 (e.g., scores 1305B, 1305C, 1305D and 1305E) may be obtained for each pair of answers. An aggregate similarity score 1399 may then be obtained from the individual similarity scores 1305, e.g., by computing their mean. The aggregate score may be used as a metric of quality of the EMM which was used to generate the evidence mappings and summary shown in FIG. 12. In general, the more similar the answers of the pairs are to each other, the higher the quality of the EMM may be assumed to be in the depicted embodiment.

Figure 14:
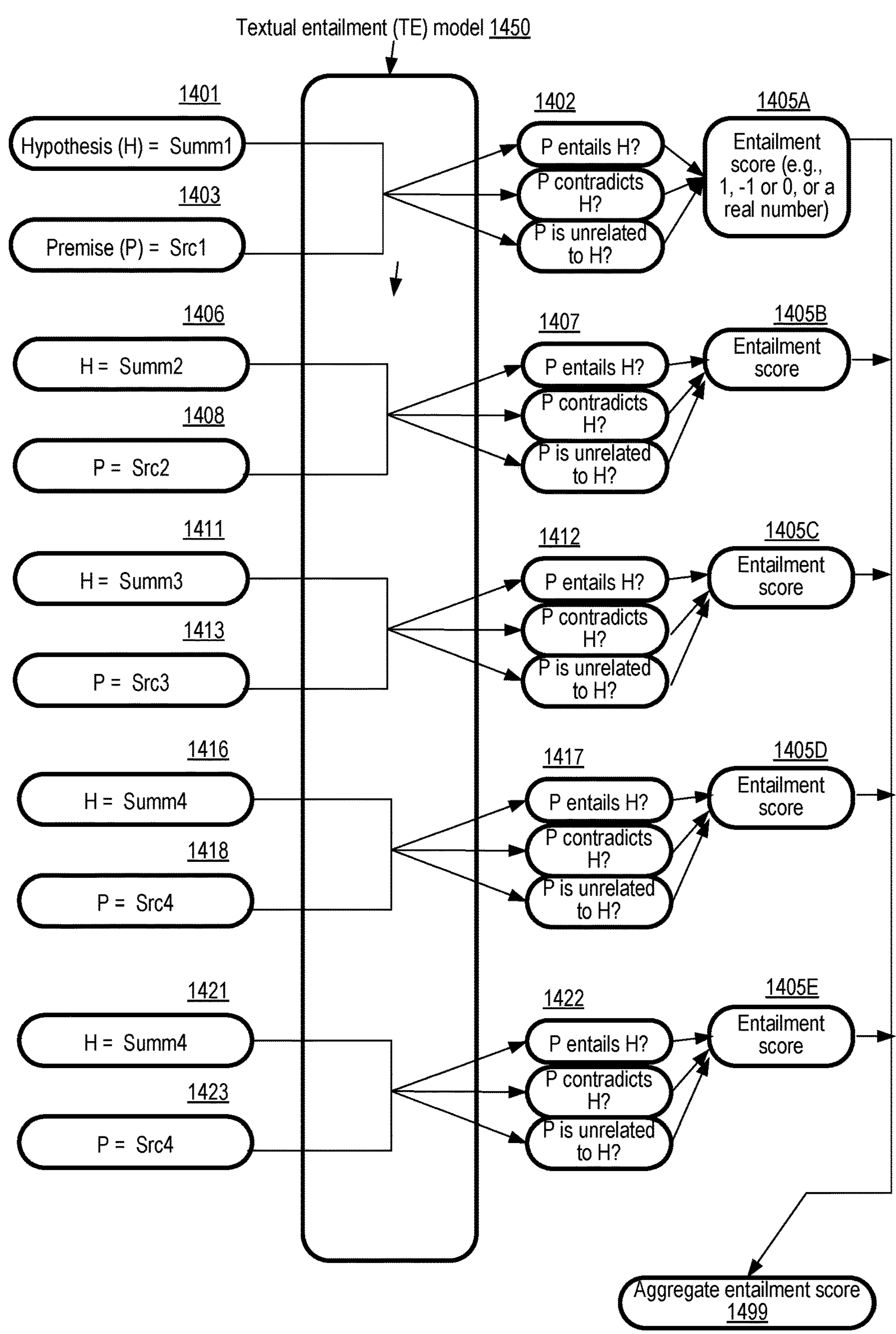
FIG. 14 illustrates an example textual entailment based technique for automating evaluation of evidence mapping models, according to at least some embodiments.

FIG. 14 illustrates an example textual entailment based technique for automating evaluation of evidence mapping models, according to at least some embodiments. In the TE-based methodology, a set of (hypothesis, premise) or (H, P) pairs of text sequences may be generated from the annotated summary 1205 and the source transcript 1204 shown in FIG. 12 in the depicted embodiment. The hypothesis or H component of the pair may be a text sequence from the summary, and the premise or P component of the pair may be the corresponding evidence text sequence of the evidence mapping generated by the EMM being evaluated. For example, in a first (H, P) pair (1401, 1403), the H may be Summ1 and the P may be Src1. Corresponding to the (H, P) pair (1401, 1403), a trained textual entailment model 1450 may generate an entailment score 1405A which in effect answers the questions 1402: Does P entail H? Does P contradict H? Or is P unrelated to H with respect to logical entailment (that is, is the TE model unable to determine a logical relationship between P and H)? In one implementation, if P entails H, a score of 1 may be generated as output by the TE model. If P contradicts H, a score of −1 may be generated, and if the TE model is unable to conclude entailment or contradiction, a score of zero may be generated. In other embodiments, instead of using integers, real numbers which may be fractions may be produced as entailment scores, with higher values indication a greater degree of estimated entailment. In various embodiments, the entailment score for a given premise and a given hypothesis may be indicative of the extent of an entailment relationship between the premise and the hypothesis, i.e., the extent to which the hypothesis is supported by the premise as determined by the TE model.

Similarly, corresponding to the (H, P) pair (1406, 1408), in which Summ2 is the hypothesis and Src2 is the premise, an entailment score 1405B may be generated by the TE model based on its conclusions regarding questions 1407. Entailment score 1405C may be generated corresponding to the (H, P) pair (1411, 1413) and questions 1412, entailment score 1405D may be generated corresponding to the (H, P) pair (1416, 1418) and questions 1417, and entailment score 1405E may be generated corresponding to the (H, P) pair (1421, 1423) and questions 1422. From the individual entailment scores 1405A 1405D, an aggregate entailment score 1499 may be computed in various embodiments, e.g., by calculating the mean of the individual scores. In some embodiments, the individual entailment scores and aggregated score may be generated such that the aggregate indicates a fraction of the (H, P) pairs in which the premise entails the hypothesis. In at least some embodiments, the aggregate entailment score may be used as a metric of quality of the EMM being evaluated. In some embodiments, the GQ. QA and TE models used for automated evaluation of EMMs may all comprise trained LLMs. In other embodiments, at least some of the QQ. QG or TE models may not comprise an LLM.

Figure 15:
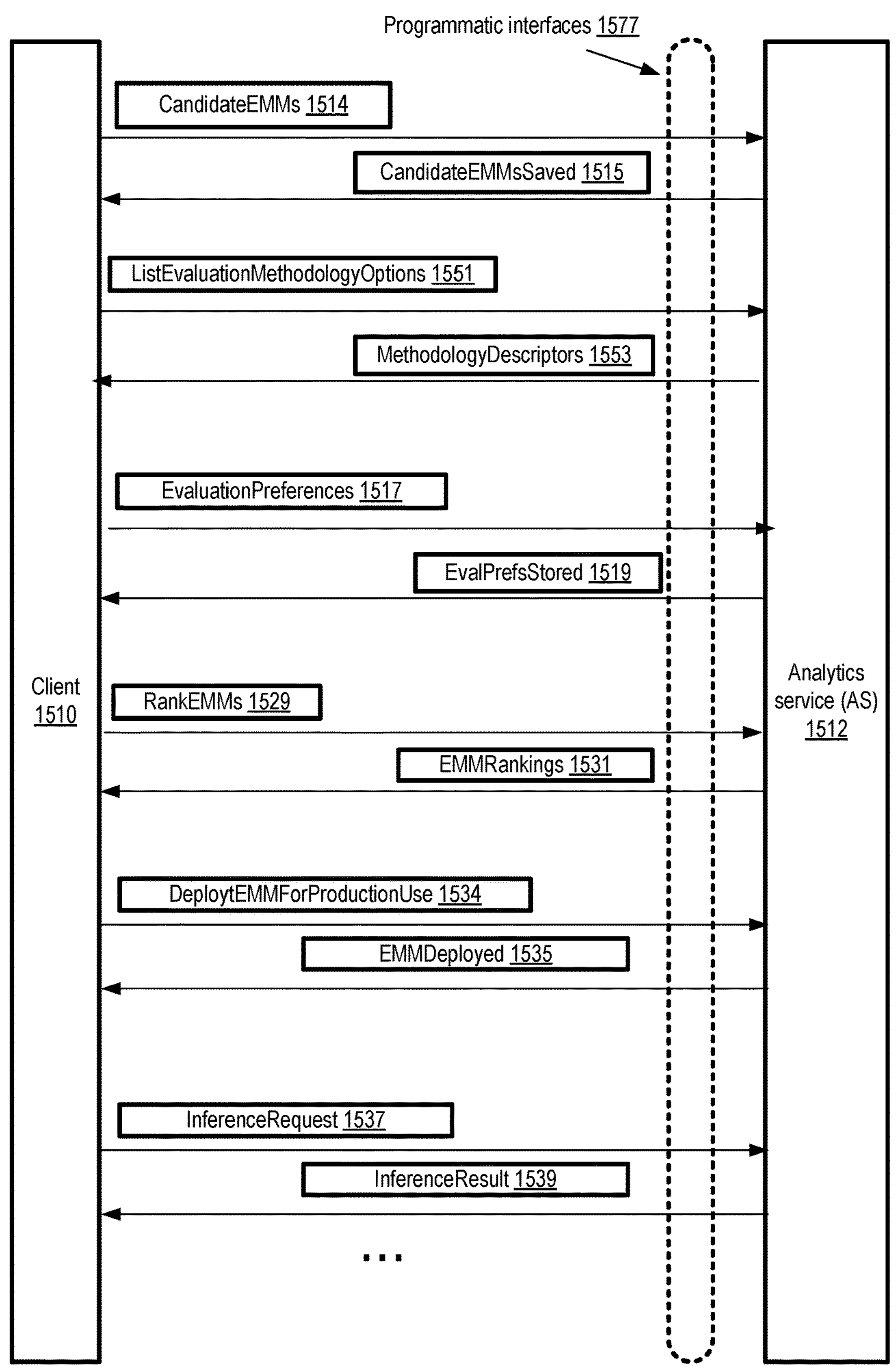
FIG. 15 illustrates example programmatic interactions pertaining to the automated evaluation of evidence mapping models between clients and an analytics service, according to at least some embodiments.

FIG. 15 illustrates example programmatic interactions pertaining to the automated evaluation of evidence mapping models between clients and an analytics service, according to at least some embodiments. An analytics service (AS) 1512, similar in features and functionality to AS 133 of FIG. 1, may implement a set of programmatic interfaces 1577 usable by clients 1510 of the AS to submit various kinds of requests and preferences pertaining to automated evaluation of EMMs and to receive corresponding responses. In embodiments in which the EMMs are to be used for annotated summarization of doctor-patient conversations, for example, the clients may include technical staff of hospitals, clinics or doctors' offices. The programmatic interfaces 1577 may for example include one or more web-based consoles, command-line tools, application programming interfaces (APIs), graphical user interfaces and the like.

A client 1510 may submit a CandidateEMMs message 1514 to provide an indication of a set of candidate trained EMMs whose quality relative to each other is to be evaluated in the depicted embodiment. The candidate EMMs may, for example, differ from one another in model size (e.g., the number of parameters), the data sets that were used to pre-train or fine tune the EMMs, the providers of the EMMs (e.g., third party organizations that may have prepared respective EMMs), and so on. In at least some embodiments, pointers to executable versions of the EMMs may be provided, or the actual executable code of the EMMs may be provided to the AS. In some embodiments, the candidate EMMs may be among the suite of ML models available at the AS. The AS may store an indication of the candidate EMMs and send a CandidateEMMsSaved message 1515 to the client in at least some embodiments.

As indicated earlier, in at least some embodiments multiple methodologies for automated evaluation of EMMs may be supported by an AS, including a QGA methodology, a TE methodology, and/or ensemble-based methodologies. A client may obtain information about the available methodologies by submitting a ListEvaluationMethodologyOptions request 1551 via the programmatic interfaces 1577 in the depicted embodiment. A list of descriptors of the methodologies supported at the AS may be transmitted to the client via a MethodologyDescriptors message 1553 in some embodiments.

The client may submit an EvaluationPreferences message 1517 to provide guidance to the AS regarding the methodology or methodologies the client wishes to utilize in the depicted embodiment. In addition to the methodology selection preferences, the client may indicate other types of preferences in some embodiments, such as whether explanations for the evaluation results are desired, how soon the evaluation results are desired, and so on. The evaluation preferences may be stored at the AS and an EvalPrefsStored message 1519 may be sent to the client. In one embodiment, instead of directly specifying an evaluation methodology to be used, the client may indicate the problem domain for which the candidate EMMs are going to be used (such as summarization of doctor-patient conversations, classification of documents in a particular scientific field, etc.), and the AS 1512 may select the methodology based on the problem domain.

A RankEMMs request 1529 may be submitted by the client in some embodiments to request evaluation and quality scores of one or more specified EMMs. For each EMM to be ranked, the request may indicate where a respective plurality of text collections which include the source text and the annotated result of the analysis performed on the source text can be obtained, as such text collections may be provided as input in the various methodologies. The text collection pairs may be provided as input to the models used in the evaluation methodology selected, and respective quality scores for each of the EMMs may be obtained at the AS. In at least one embodiment, even if multiple methodologies are being used (such as both the QGA and the TE methodology), respective quality scores generated for the EMMs by each methodology may be provided via programmatic interfaces 1577 to the client, e.g., in addition to aggregate quality scores which combine the scores from multiple methodologies. In at least some embodiments, explanations for the quality scores and the rankings based on the quality scores may be provided via one or more EMM-Rankings messages 1531. For example, if the QGA approach is being used, a natural language explanation of the similarity scores among at least some of the answers generated may be presented, while entailment scores for at least some sentence pairs may be included in the explanation if the TE approach is used. In some embodiments, the EMM-Rankings may include the quality scores, but may not include explanations. In at least one embodiment, the EMM-Rankings may not necessarily include the absolute quality scores of the different EMMs; instead, for example, just the ranking positions of the different EMMs being evaluated may be presented. In one embodiment, instead of providing already-generated text collections which include summaries or other annotated analysis results, a RankEMMs request may simply indicate a set of source text collections which are to be utilized as input to each of the EMMs to obtain the annotated analysis results; once the annotated analysis results corresponding to the source text collections are obtained from a given EMM, the evaluation methodologies may be implemented. Using a common set of source text for all the EMMs which are to be compared may help to eliminate differences in evaluation results which could bias the rankings. In some embodiments in which the RankEMMs request includes pointers to the generated annotated results of the different EMMs, the source text that was used as input to generate the annotated results may be identical for all the candidate EMMs. In some embodiments, instead of requesting rankings of various EMMs, a client may simply request an evaluation of the quality of a single EMM at a time, and be provided a respective quality score for that EMM by the AS.

After the rankings of the candidate EMMs are determined, the client may submit a DeployEMMForProductionUse request 1534, indicating a particular EMM of the candidate EMMs (e.g., the one with the highest quality score, which was the highest-ranked among the candidate EMMs which were evaluated) which should be deployed for production use at the AS. The EMM may be deployed (e.g., resources for executing the EMM in response to inference requests may be allocated or identified at the AS), and an EMMDeployed message 1535 may be sent to the client in some embodiments.

An InferenceRequest 1537 may be submitted to the AS to produce an annotated analysis result (such as a summary) for a particular source text collection (e.g., a transcript of a conversation) indicated in the request (in accordance with an instruction prompt included along with the source text) using a specified EMM. The source text indicated in the inference may be provided as input to the specified EMM, and the result generated by the LLM may be provided to the client via one or more InferenceResult messages 1539 in some embodiments. In at least some embodiments, programmatic interactions other than those shown in FIG. 15 may be supported with regard to the preparation and use of LLMs of an AS.

FIG. 16 is a flow diagram illustrating aspects of operations which may be performed to automate evaluation of evidence mapping models, according to at least some embodiments. As shown in element 1602, a group of evidence mapping models (EMMs) EMM1, EMM2, . . . , whose quality is to be evaluated may be identified, e.g., based on input received via programmatic interfaces of an analytics service (AS) of a cloud provider network or cloud computing environment. The EMMs may for example comprise LLMs trained using respective data sets to provide summaries of source text collections (STCs) along with evidence for various portions of the summaries (e.g., in the form of mappings, referred to as evidence mappings, between sentences in the summary and corresponding portions of the source text).

Corresponding to each EMM, a set of pairs of text collections may be obtained at the AS in various embodiments to help evaluate the EMM (element 1606). A given pair of text collections may include an STC and the corresponding output generated by the EMM—e.g., an annotated summary of the STC with evidence mappings.

An evaluation methodology may be selected for the EMMs from among a set of automated evaluation methodologies supported by the AS (element 1608) in the depicted embodiment. The selection may be based on the problem domain for which the EMMs are going to be utilized in some cases (e.g., for some problem domains such as doctor-patient conversation summarization, there may be better trained QG/QA models available at the AS than trained TE models, so the QGA approach may be selected), and/or based on programmatic input from a client on whose behalf the EMMs are to be evaluated.

In the embodiment depicted in FIG. 16, at least three automated evaluation methodologies may be supported at the AS: a QGA-only methodology, a TE-only methodology, and an ensemble methodology in which results from both the QGA and TE approaches may be aggregated to arrive at the final quality metric for the EMMs. In other embodiments, other combinations of automated methodologies may be available at the AS.

If a QGA-only approach is selected, as detected in operations corresponding to element 1611, a pre-trained QG model and a pre-trained QA model to be used for the evaluation may be selected in various embodiments. The QG and/or the QA models may comprise one or more LLMs in some embodiments. From individual summary sentences (or text sequences) in the summaries of the pairs of text collections, one or more questions may be generated using the trained QG model (element 1613).

For each question, two answers may be generated using the QA model in the depicted embodiment (element 1616). A first answer, denoted Ans-Summ, may be based on providing the summary sentence (from which the question was generated) and the question itself as input to the QA model. A second answer, denoted Ans-Evid, may be based on providing the evidence (within the STC) for the summary sentence, along with the question, as input to the QA model.

Similarity scores may then be computed for each (Ans-Summ, Ans-Evid) pair for a given EMM, to determine how similar the answers generated using the summary sentences are to the answers generated using the corresponding evidence (element 1616). An aggregated similarity score may be computed for the EMM from the scores for the different pairs. The aggregated score may, for example, be the mean of the scores generated for the different answer pairs in one implementation; in other implementations, statistics other than the mean may be used. The aggregated summary scores may be used as quality metrics to rank the EMMs relative to each other, with higher aggregated scores indicating higher quality and hence higher rank (element 1619) in the depicted embodiment. In some embodiments, the quality metrics obtained using the QGA approach for individual ones of the EMMs may be provided via programmatic interfaces of the AS to the client on whose behalf the EMMs are being evaluated. In at least one embodiment, in addition to the quality metrics themselves, corresponding explanations (indicating at least some of the similarity scores resulting from analysis of the answers, some of the questions and corresponding answers, etc. which led to the quality metrics) may be presented via programmatic interfaces.

If a TE-only methodology is selected, in operations corresponding to element 1621, the following operations may be performed. For each summary sentence, the summary sentence may be designated as a hypothesis (H), the corresponding STC evidence sentence may be designated as a premise (P), and then the (P. H) combination may be provided as input to a trained TE model (element 1623). The TE model may generate a corresponding entailment score, indicating for example the extent to which the hypothesis logically follows from, or is entailed by, the premise. In some implementations, integer entailment scores may be generated, with three possible values: +1 if H is entailed by P, −1 if H is contradicted by P, and 0 if H is neither entailed by nor contradicted by P. In other implementations, real numbers within some range may be generated as entailment scores, with higher numbers indicating a higher extent of entailment of H by P. For each of the EMMs being considered, a respective aggregated entailment score may be obtained from the entailment scores of the (P. H) pairs associated with that EMM (element 1626). This aggregated entailment score may be used as a quality metric to rank the EMMs in the depicted embodiment (element 1629), e.g., with higher aggregated scores indicating higher quality. In some embodiments, the quality metrics obtained using the TE approach for individual ones of the EMMs may be provided via programmatic interfaces of the AS to the client on whose behalf the EMMs are being evaluated. In at least one embodiment, in addition to the TE-based quality metrics themselves, corresponding explanations (indicating at least some of the entailment scores) may be presented via programmatic interfaces.

If an ensemble-based evaluation methodology is selected (as also determined in operations corresponding to element 1621 in the depicted embodiment), respective aggregated quality metrics may be obtained for the EMMs using both the QGA approach and the TE approach (element 1629), e.g., by performing at least some of the operations of elements 1613, 1616, 1616, 1619, 1623, 1626 and 1629. The aggregated quality metrics obtained from the two approaches may then themselves be combined or aggregated (e.g., using a weighted sum of the QGA metrics and the TE metrics) to obtain an overall quality metric (element 1631). The EMMs may be ranked using this overall metric, and the resulting overall metrics may be presented via programmatic interfaces along with corresponding explanations in some embodiments.

It is noted that in various embodiments, some of the operations shown in the flow diagrams of FIG. 9 and/or FIG. 16 may be implemented in a different order than that shown in the figure, or may be performed in parallel rather than sequentially. Additionally, some of the operations shown in FIG. 9 and/or FIG. 16 may not be required in one or more implementations.

In some embodiments, as mentioned earlier, an analytics service similar in features and functionality to AS 133 of FIG. 1 may be implemented as part of a cloud provider network or cloud computing environment. A provider network can be formed as a number of regions in some embodiments, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN (virtual private network) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, an AS may be implemented at least in part using an edge location of the provider network instead of or in addition to regional data centers. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network.

The cloud provider network may implement various computing resources or services, which may include an AS, a VCS, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

A VCS of the cloud provider network may offer virtual compute instances (also referred to as virtual machines, or simply "instances") with varying computational and/or memory resources in various embodiments. In one embodiment, each of the virtual compute instances may correspond to one of several instance types or families, and instances of any of several families may be employed for the web information extraction model preparation and execution workflow. An instance type may be characterized by its hardware type, computational resources (e.g., number, type, and configuration of central processing units [CPUs] or CPU cores, hardware accelerators for various tasks), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. Various types of compute instances running at computing servers of a VCS, some of which may have access to hardware accelerators (e.g., incorporated within cards connected via Peripheral Component Interconnect-Express (PCIe) links to the primary processors of virtualization servers at which the compute instances are run) may be used to perform operations of an AS of the kind described above in different embodiments.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. Components of an AS may be run using containers in at least some embodiments; for example, LLMs for annotated summarization or other tasks may be executed within containers, QQ. QA and/or TE models may be run within containers, and so on.

The traffic and operations of the cloud provider network, and individual services such as the AS, may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components of services such as the AS) may share the virtualized servers with the data plane, and control plane traffic and data plane traffic may be sent over separate/distinct networks.

Figure 17:
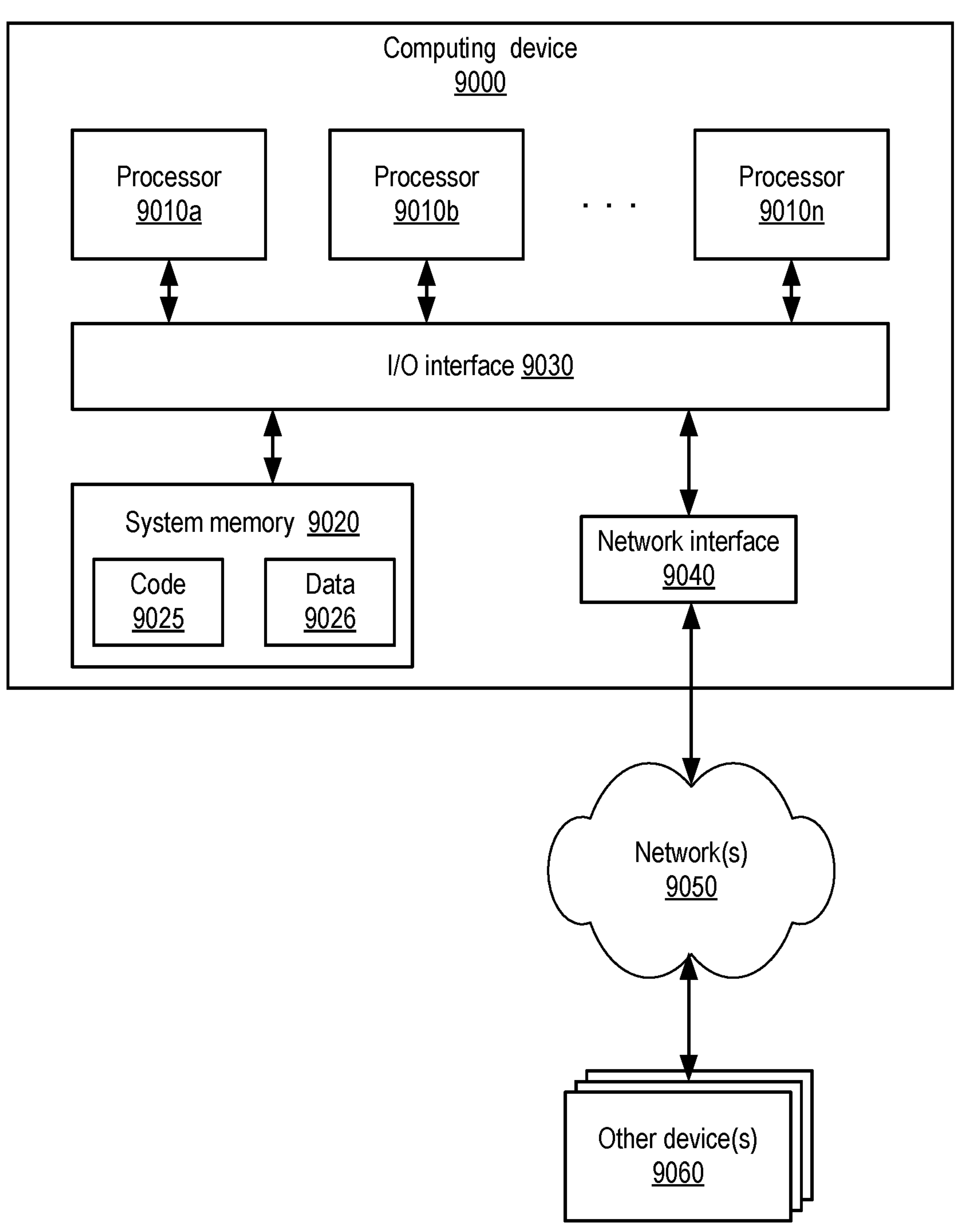
FIG. 17 is a block diagram illustrating an example computing device that may be used in at least some embodiments.

In at least some embodiments, a server that implements the types of techniques described herein (e.g., including functions of an AS and/or other services of a cloud provider network) may include a general-purpose computer system that includes or is configured to access one or more computer-accessible media. FIG. 17 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC. SPARC. ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 16, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 16. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 17 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

one or more computing devices;

wherein the one or more computing devices include instructions that upon execution on or across the one or more computing devices cause the one or more computing devices to:

identify, at a network-accessible service of a cloud provider network, a pre-trained version of a particular large language model (LLM) which is to be used to generate summaries of dialogs between two or more dialog participants;

obtain, at the network-accessible service, a data set comprising a plurality of records, wherein an individual record of the plurality of records comprises (a) an instruction prompt requesting a creation of an annotated summary of a transcript of a dialog between a first dialog participant and at least a second dialog participant, (b) the transcript of the dialog, and (c) an annotated summary of the transcript, wherein the annotated summary comprises a plurality of text sequences, wherein the annotated summary comprises a respective annotation corresponding to individual text sequences of the plurality of text sequences, and wherein a particular one of the annotations corresponding to a particular text sequence indicates a portion of the transcript which comprises evidence for the particular text sequence;

fine-tune, by the network-accessible service using the data set comprising the particular annotation that indicates the portion of the transcript which comprises evidence for the particular text sequence, the pre-trained version of the LLM to obtain a fine-tuned version of the LLM which has learned to generate annotated summaries of transcripts of dialogs; and provide, by the network-accessible service via one or more programmatic interfaces, a first annotated summary of a first transcript of a first dialog between at least a particular pair of dialog participants, wherein the first annotated summary is generated using the fine-tuned version, wherein a first annotation included in the first annotated summary indicates a portion of the first transcript which provides evidence for a first text sequence of the first annotated summary, and wherein individual ones of the dialog participants of the particular pair have opted in for automated summarization of the first dialog.

2. The system as recited in claim 1, wherein the first dialog is a dialog between a medical professional and a patient.

3. The system as recited in claim 1, wherein the first annotation of the first annotated summary indicates the portion of the first transcript using a numeric citation format, wherein according to the numeric citation format, respective turns of the first dialog are assigned respective numerals.

4. The system as recited in claim 1, wherein the one or more computing devices include further instructions that upon execution on or across the one or more computing devices further cause the one or more computing devices to:

generate the transcript of the first dialog at the cloud provider network in response to receiving audio of the first dialog at the cloud provider network.

5. The system as recited in claim 1, wherein the one or more computing devices include further instructions that upon execution on or across the one or more computing devices further cause the one or more computing devices to:

determine, prior to generation of the first annotated summary of the first transcript, a set of valid annotation options for indicating evidence in the first annotated summary; and constrain the fine-tuned version of the LLM to include, in the first annotated summary when performing inference computations used to generate the first annotated summary, no other annotation options than members of the set of valid annotation options.

6. A computer-implemented method, comprising:

obtaining, at a network-accessible service, a data set comprising a plurality of records, wherein an individual record of the plurality of records comprises at least (a) a transcript of a dialog between a first dialog participant and a second dialog participant, and (b) an annotated summary of the dialog, wherein the annotated summary comprises a plurality of text sequences, wherein the annotated summary comprises a respective annotation corresponding to individual text sequences of the plurality of text sequences, and wherein a particular annotation corresponding to a particular text sequence indicates a portion of the transcript which comprises evidence for the particular text sequence;

training, by the network-accessible service and using the data set comprising the particular annotation that indicates the portion of the transcript which comprises evidence for the particular text sequence, a large language model (LLM) to generate annotated summaries of transcripts of dialogs, wherein annotations in the generated annotated summaries indicate portions of corresponding transcripts which comprise evidence for one or more text sequences included in the annotated summaries; and providing, via one or more programmatic interfaces, a representation of a first annotated summary of a first transcript of a first dialog, wherein the first annotated summary is generated using a trained version of the LLM.

7. The computer-implemented method as recited in claim 6, wherein a particular record of the plurality of records includes an instruction prompt requesting generation of an annotated summary of a particular transcript included in the particular record.

8. The computer-implemented method as recited in claim 7, further comprising:

extracting one or more keywords from the particular transcript, wherein the instruction prompt includes an instruction to include the one or more keywords in the annotated summary of the particular transcript.

9. The computer-implemented method as recited in claim 6, wherein the plurality of records includes a first record and a second record, wherein the first record comprises a first instruction prompt to generate a first annotated summary, wherein the second record comprises a second instruction prompt to generate a second annotated summary, and wherein the first instruction prompt includes a text token which is not included in the second instruction prompt.

10. The computer-implemented method as recited in claim 6, further comprising:

determining, prior to generation of the first annotated summary of the first transcript, a set of valid annotation options for indicating evidence in the first annotated summary; and constraining the trained version of the LLM to include, when performing inference computations used to generate the first annotated summary, no other annotation options than members of the set of valid annotation options.

11. The computer-implemented method as recited in claim 10, wherein said constraining comprises setting a probability associated with a particular vocabulary token of the trained version of the LLM to a particular value.

12. The computer-implemented method as recited in claim 6, wherein the particular annotation corresponding to the particular text sequence indicates the portion of the transcript which comprises evidence for the particular text sequence using a numeric citation format, wherein according to the numeric citation format, turns by respective participants of the dialog are assigned respective numerals.

13. The computer-implemented method as recited in claim 6, further comprising:

generating, at a cloud provider network, in response to receiving audio of the first dialog, the transcript of the first dialog.

14. The computer-implemented method as recited in claim 6, wherein said providing the representation of the first annotated summary comprises:

providing, via a graphical user interface, a visual cue of an evidentiary relationship between a portion of the first annotated summary and a portion of the first transcript.

15. The computer-implemented method as recited in claim 6, wherein the first dialog is a dialog between a medical professional and a patient.

16. One or more non-transitory computer-accessible storage media storing program instructions that when executed on or across one or more processors cause the one or more processors to:

obtain a data set comprising a plurality of records, wherein an individual record of the plurality of records comprises (a) a source set of text tokens to be analyzed, and (b) an annotated analysis result generated from the source set, wherein the annotated analysis result comprises one or more text sequences, wherein the annotated analysis result comprises a respective annotation corresponding to individual text sequences of the one or more text sequences, and wherein a particular annotation corresponding to a particular text sequence indicates a portion of the source set which comprises evidence for the particular text sequence;

train, using the data set comprising the particular annotation that indicates the portion of the source set which comprises evidence for the particular text sequence, a machine learning model to generate annotated analysis results of source sets of text tokens, wherein annotations in the generated annotated analysis results indicate portions of corresponding source sets of text tokens which comprise evidence for one or more text sequences included in the annotated analysis results; and provide, via one or more programmatic interfaces, a first annotated analysis result corresponding to a first source set of text tokens, wherein the first annotated analysis result is generated using a trained version of the machine learning model.

17. The one or more non-transitory computer-accessible storage media as recited in claim 16, wherein the first source set of text tokens comprises a transcript of a conversation, and wherein the first annotated analysis result comprises a summary of the conversation.

18. The one or more non-transitory computer-accessible storage media as recited in claim 16, wherein the first annotated analysis result comprises an answer to a question pertaining to the first source set.

19. The one or more non-transitory computer-accessible storage media as recited in claim 16, wherein a particular record of the plurality of records includes an instruction prompt.

20. The one or more non-transitory computer-accessible storage media as recited in claim 16, wherein the particular annotation corresponding to the particular text sequence indicates the portion of the source set which comprises evidence for the particular text sequence using a numeric citation format.

* * * * *